United States Patent
Lam et al.

(10) Patent No.: US 10,370,469 B2
(45) Date of Patent: Aug. 6, 2019

(54) ETHYLENE/1-BUTENE COPOLYMERS WITH ENHANCED RESIN PROCESSABILITY

(71) Applicant: NOVA Chemicals (International) S.A., Fribourg (CH)

(72) Inventors: Patrick Lam, Calgary (CA); Victoria Ker, Calgary (CA); Robert Quaiattini, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 0 days.

(21) Appl. No.: 15/720,233

(22) Filed: Sep. 29, 2017

(65) Prior Publication Data
US 2018/0022844 A1 Jan. 25, 2018

Related U.S. Application Data

(62) Division of application No. 15/163,266, filed on May 24, 2016, now Pat. No. 9,815,925.

(30) Foreign Application Priority Data

May 27, 2015 (CA) .................................. 2892882

(51) Int. Cl.
| | | |
|---|---|---|
| *C08F 210/16* | (2006.01) | |
| *C08F 210/08* | (2006.01) | |
| *C08F 4/6592* | (2006.01) | |
| *C08J 5/18* | (2006.01) | |
| *B32B 27/32* | (2006.01) | |
| *B32B 7/12* | (2006.01) | |
| *B32B 27/08* | (2006.01) | |
| *C08F 4/659* | (2006.01) | |

(52) U.S. Cl.
CPC .............. *C08F 210/16* (2013.01); *B32B 7/12* (2013.01); *B32B 27/08* (2013.01); *B32B 27/32* (2013.01); *B32B 27/327* (2013.01); *C08F 4/6592* (2013.01); *C08F 210/08* (2013.01); *C08J 5/18* (2013.01); *B32B 2250/24* (2013.01); *B32B 2307/4026* (2013.01); *B32B 2307/54* (2013.01); *B32B 2307/558* (2013.01); *B32B 2307/5825* (2013.01); *C08F 4/65912* (2013.01); *C08F 4/65916* (2013.01); *C08F 2410/02* (2013.01); *C08F 2420/04* (2013.01); *C08F 2500/26* (2013.01); *C08J 2323/08* (2013.01)

(58) Field of Classification Search
CPC ..... C08F 210/16; C08F 210/08; C08F 4/6592
See application file for complete search history.

(56) References Cited

U.S. PATENT DOCUMENTS

| | | |
|---|---|---|
| 3,248,179 A | 4/1966 | Norwood |
| 4,325,849 A | 4/1982 | Rosen et al. |
| 4,482,687 A | 11/1984 | Noshay et al. |
| 4,543,399 A | 9/1985 | Jenkins, III et al. |
| 4,588,790 A | 5/1986 | Jenkins, III et al. |
| 4,613,484 A | 9/1986 | Ayres et al. |
| 4,701,432 A | 10/1987 | Welborn, Jr. |
| 4,808,561 A | 2/1989 | Welborn, Jr. |
| 4,935,397 A | 6/1990 | Chang |
| 4,937,301 A | 6/1990 | Chang |
| 5,026,795 A | 6/1991 | Hogan |
| 5,028,670 A | 7/1991 | Chinh et al. |
| 5,057,475 A | 10/1991 | Canich et al. |
| 5,064,802 A | 11/1991 | Stevens et al. |
| 5,096,867 A | 3/1992 | Canich |
| 5,132,380 A | 7/1992 | Stevens et al. |
| 5,283,278 A | 2/1994 | Daire et al. |
| 5,317,036 A | 5/1994 | Brady, III et al. |
| 5,324,800 A | 6/1994 | Welborn, Jr. et al. |
| 5,352,749 A | 10/1994 | DeChellis et al. |
| 5,405,922 A | 4/1995 | DeChellis et al. |
| 5,433,471 A | 7/1995 | Shepherd et al. |
| 5,436,304 A | 7/1995 | Griffin et al. |
| 5,462,999 A | 10/1995 | Griffin et al. |
| 5,616,661 A | 4/1997 | Eisinger et al. |
| 5,633,394 A | 5/1997 | Welborn, Jr. et al. |
| 5,668,228 A | 9/1997 | Chinh et al. |
| 5,684,097 A | 11/1997 | Palmroos et al. |
| 5,703,187 A | 12/1997 | Timmers |
| 5,965,677 A | 10/1999 | Stephan et al. |
| 6,002,033 A | 12/1999 | Razavi et al. |
| 6,022,935 A | 2/2000 | Fischer et al. |
| 6,034,021 A | 3/2000 | Wilson et al. |
| 6,063,879 A | 5/2000 | Stephan et al. |
| 6,103,657 A | 8/2000 | Murray |
| 6,114,479 A | 9/2000 | Speca et al. |
| 6,124,230 A | 9/2000 | Speca et al. |
| 6,140,432 A | 10/2000 | Agapiou et al. |
| 6,235,672 B1 | 5/2001 | McKay et al. |

(Continued)

FOREIGN PATENT DOCUMENTS

| | | |
|---|---|---|
| CA | 2 716 772 A1 | 4/2011 |
| EP | 0 107 127 A1 | 5/1984 |

(Continued)

OTHER PUBLICATIONS

ASTM F88/F88M-09; Standard Test Method for Seal Strength of Flexible Barrier Materials; Copyright ASTM International 2009; Downloaded May 21, 2013; pp. 1-6.

(Continued)

*Primary Examiner* — Caixia Lu

(74) *Attorney, Agent, or Firm* — Julie L. Heinrich

(57) ABSTRACT

Ethylene/1-butene copolymers made with a single site catalyst system have high melt strength and good processability.

8 Claims, 10 Drawing Sheets

(56) References Cited

U.S. PATENT DOCUMENTS

| | | |
|---|---|---|
| 6,271,325 B1 | 8/2001 | McConville et al. |
| 6,274,684 B1 | 8/2001 | Loveday et al. |
| 6,277,931 B1 | 8/2001 | Jaber et al. |
| 6,300,436 B1 | 10/2001 | Agapiou et al. |
| 6,300,438 B1 | 10/2001 | McConville |
| 6,300,439 B1 | 10/2001 | McConville |
| 6,303,719 B1 | 10/2001 | Murray et al. |
| 6,306,984 B1 | 10/2001 | Agapiou et al. |
| 6,309,997 B1 | 10/2001 | Fujita et al. |
| 6,320,002 B1 | 11/2001 | Murray et al. |
| 6,342,463 B1 | 1/2002 | Stephan et al. |
| 6,372,864 B1 | 4/2002 | Brown |
| 6,391,819 B1 | 5/2002 | Agapiou et al. |
| 6,399,535 B1 | 6/2002 | Shih et al. |
| 6,399,724 B1 | 6/2002 | Matsui et al. |
| 6,417,304 B1 | 7/2002 | McConville et al. |
| 6,472,342 B2 | 10/2002 | Agapiou et al. |
| 6,489,413 B1 | 12/2002 | Floyd et al. |
| 6,559,090 B1 | 5/2003 | Shih et al. |
| 6,562,924 B2 | 5/2003 | Benazouzz et al. |
| 6,583,083 B2 | 6/2003 | Murray et al. |
| 6,593,266 B1 | 7/2003 | Matsui et al. |
| 6,608,153 B2 | 8/2003 | Agapiou et al. |
| 6,686,306 B2 | 2/2004 | Shih |
| 6,689,847 B2 | 2/2004 | Mawson et al. |
| 6,734,131 B2 | 5/2004 | Shih et al. |
| 6,770,723 B2 | 8/2004 | Fujita et al. |
| 6,777,509 B2 | 8/2004 | Brown et al. |
| 6,968,375 B1 | 11/2005 | Brown |
| 6,984,695 B2 | 1/2006 | Brown et al. |
| 7,354,880 B2 | 4/2008 | Agapiou et al. |
| 7,476,715 B2 | 1/2009 | McKay et al. |
| 9,115,233 B2 | 8/2015 | Ker et al. |
| 2011/0212315 A1 | 9/2011 | Fantinel et al. |
| 2014/0100343 A1 | 4/2014 | Ker et al. |

FOREIGN PATENT DOCUMENTS

| | | |
|---|---|---|
| EP | 0 659 773 A1 | 6/1995 |
| EP | 0 811 638 A2 | 12/1997 |
| WO | 93/03093 A1 | 2/1993 |
| WO | 95/04761 A1 | 2/1995 |

OTHER PUBLICATIONS

ASTM D882-10; Standard Test Method for Tensile Properties of Thin Plastic Sheeting; Copyright ASTM International 2010; Downloaded Nov. 17, 2011; pp. 1-10.

ASTM D1238-10; Standard Test Method for Melt Flow Rates of Thermoplastics by Extrusion Plastometer; Copyright ASTM International 2010; Downloaded Nov. 17, 2011; pp. 1-15.

ASTM D792-13; Standard Test Methods for Density and Specific Gravity (Relative Density) of Plastics by Displacement; Copyright ASTM International 2013; Downloaded Feb. 24, 2014; pp. 1-6.

Heiber, C.A. and Chiang, H.H.; Shear-Rate-Dependence Modeling of Polymer Melt Viscosity; Polymer Engineering and Science, Jul. 1992, vol. 32, No. 14, pp. 931-938.

Heber, C.A. and Chiang, H.H.; Some correlations involving the shear viscosity of polystyrene melts; Rheologica Acta, Jul. 1989, vol. 28, Issue 4, pp. 321-332.

Bird, R. Byron, Armstrong, Robert C., Hassager, Ole; Dynamics of Polymeric Liquids, vol. 1: Fluid Mechanics, 2nd Edition; Chapter 4: The Generalized Newtonian Fluid; May 1987, pp. 169-175.

Peri, J.B. and Hensley, A.L. Jr.; The Surface Structure of Silica Gel; The Journal of Physical Chemistry; vol. 72, No. 8, Aug. 1968; pp. 2926-2933.

Brunauer, Stephen, Emmett, P.H. and Teller, Edward; Adsorption of Gases in Multimolecular Layers; Journal of the American Chemical Society, Feb. 1938, 60(2), pp. 309-319.

Clark, James H. and Macquarrie, Duncan J.; Supported Catalysts; Kirk-Othmer Encyclopedia of Chemical Technology, Copyright 2001 by John Wiley & Sons; Published online; Nov. 15, 2002; pp. 1-37.

Pangborn, Amy B., Giardello, Michael A., Grubbs, Robert H., Rosen, Robert K. and Timmers, Francis J.; Safe and Convenient Procedure for Solvent Purification; Organometallics, 1996, 15 (5); copyright 1996 by the American Chemical Society; Publication date (Web): Mar. 5, 1996, pp. 1518-1520.

ASTM D 6474-99; Standard Test Method for Determining Molecular Weight Distribution and Molecular Weight Averages of Polyolefins by High Temperature Gel Permeation Chromatography; Copyright by ASTM International 1999; Downloaded May 21, 2013; pp. 1-6.

ASTM D 5748-95 (Reapproved 2012); Standard Test Method for Protrusion Puncture Resistance of Stretch Wrap Film; Copyright by ASTM International 1995, Downloaded Jul. 22, 2015; pp. 1-4.

ASTM D5227-01 (Reapproved 2008); Standard Test Method for Measurement of Hexane Extractable Content of Polyolefins; Copyright by ASTM International 2001; Downloaded Aug. 13, 2012; pp. 1-4.

ASTM D 1922-03a; Standard Test Method for Propagation Tear Resistance of Plastic Film and Thin Sheeting by Pendulum Method; Copyright by ASTM International 2003; Downloaded Nov. 18, 2011; pp. 1-6.

ASTM D 2457-03; Standard Test Method for Specular Gloss of Plastic Films and Solid Plastics; Copyright by ASTM International 2003; Downloaded Nov. 17, 2011; pp. 1-5.

ASTM D 1709-04; Standard Test Methods for Impact Resistance of Plastic Film by the Free-Falling Dart Method; Copyright by ASTM International 2004; Downloaded Feb. 7, 2012; pp. 1-9.

ASTM D 1003-07; Standard Test Method for Haze and Luminous Transmittance of Transparent Plastics; Copyright by ASTM International 2007; Downloaded Feb. 2, 2012; pp. 1-7.

1

ETHYLENE/1-BUTENE COPOLYMERS WITH ENHANCED RESIN PROCESSABILITY

REFERENCE TO RELATED APPLICATION

This application is a divisional of U.S. Ser. No. 15/163,266, filed May 24, 2016, entitled "Ethylene/1-Butene Copolymers With Enhanced Resin Processability" which is herein incorporated by reference in its entirety.

The disclosure is directed to ethylene/1-butene copolymers having improved melt strength and processability. The ethylene/1-butene copolymers are made with a single site catalyst system rather than a traditional Ziegler-Natta catalyst and have a density of from 0.912 to 0.940 g/cm³.

It is well known that ethylene copolymers of 1-butene generally have inferior mechanical properties (e.g., tear strength and dart impact) when compared to ethylene copolymers of 1-hexene or 1-octene. Nevertheless ethylene/1-butene copolymer resins remain an important staple resin due to their lower cost combined with acceptable performance and processability in several end use applications.

Most commercially available ethylene/1-butene copolymers are made using traditional Ziegler-Natta catalysts. These copolymers typically have a density of above about 0.912 g/cm³ and are known as linear low density polyethylene (LLDPE) to distinguish them from low density polyethylene (LDPE) which has long chain branching and which is made by a free radical polymerization process at high pressure. Ziegler-Natta catalysts, however, do not perform well when making very low density ethylene copolymer materials such as plastomers which generally have densities of about 0.910 g/cm³ or less. Such polymers, also known in the art as very low density polyethylene or VLDPE, are best prepared using single site catalysts such as metallocene catalysts. For example, ExxonMobil produces a VLDPE with a metallocene under gas phase polymerizations conditions and the polymer is sold under the trademark EXACT. EXACT grades are available as ethylene/1-butene copolymers or ethylene/1-hexene copolymers.

In U.S. Patent Application Publication No. 2014/0100343 A1, we described ethylene/1-hexene copolymers made using a phosphinimine catalyst having an indenyl type ligand.

There remains a need for linear low density polyethylene (LLDPE), including ethylene/1-butene copolymers, having improved processability and rheological properties.

In some embodiments, we disclose an ethylene/1-butene copolymer having a density of from about 0.912 to about 0.940 g/cm³, which has improved rheological parameters such as melt strength and shearing thinning index.

In an embodiment of the disclosure, an ethylene copolymer is provided, the ethylene copolymer being made by polymerizing ethylene and 1-butene with a single site catalyst system in a polymerization reactor, the ethylene/1-butene copolymer having a density of from 0.912 to 0.94 g/cm³, a melt index ($I_2$) of from 0.5 to 10 g/10 min, a melt flow ratio ($I_{21}/I_2$) of from 20 to 35, a molecular weight distribution ($M_w/M_n$) of from 2.0 to 4.5, and which has an accelerated haul-off melt strength ($\sigma^{MS}$) as determined by Rosand capillary rheometry at 190° C., of at least 3.0 cN.

In an embodiment of the disclosure, a process for making an ethylene/1-butene copolymer is provided, the process comprising polymerizing ethylene and 1-butene with a single site catalyst system in a gas phase polymerization reactor, wherein the ethylene/1-butene copolymer has a density of from 0.912 to 0.94 g/cm³, a melt index ($I_2$) of from 0.5 to 10 g/10 min, a melt flow ratio ($I_{21}/I_2$) of from 20 to 35, a molecular weight distribution ($M_w/M_n$) of from 2.0 to 4.5, and which has an accelerated haul-off melt strength ($\sigma^{MS}$) as determined by Rosand capillary rheometry at 190° C., of at least 3.0 cN.

In an embodiment of the disclosure, an ethylene copolymer is provided the ethylene copolymer being made by polymerizing ethylene and 1-butene with a single site catalyst system in a polymerization reactor, the ethylene copolymer having a density of from 0.912 to 0.94 g/cm³, a melt index ($I_2$) of from 0.5 to 10 g/10 min, a melt flow ratio ($I_{21}/I_2$) of from 20 to 35, a molecular weight distribution ($M_w/M_n$) of from 2.0 to 4.5, and which satisfies the following relationship:

$$(CDBI_{50}/\delta_{XO})^{3.0} \leq 6.5 - 5.7 \log [a(1.5(I_{21}/I_2) + (M_w/M_n))];$$

where $CDBI_{50}$ is the composition distribution breadth index, $\delta_{XO}$ is the crossover phase angle at a frequency of 1.0 rad/s and a is the CY a parameter.

In an embodiment of the disclosure, an ethylene copolymer is provided the ethylene copolymer being made by polymerizing ethylene and 1-butene with a single site catalyst system in a polymerization reactor, the ethylene copolymer having a density of from 0.912 to 0.94 g/cm³, a melt index ($I_2$) of from 0.5 to 10 g/10 min, a melt flow ratio ($I_{21}/I_2$) of from 20 to 35, a molecular weight distribution ($M_w/M_n$) of from 2.0 to 4.5, and which satisfies the following relationships: $(CDBI_{50}/\delta_{XO})^{3.0} \leq 6.5 - 5.7 \log [a(1.5(I_{21}/I_2) + (M_w/M_n))]$ and $\sigma^{MS} \geq 5.0 \times 10^{-4} \times G^*_{XO}$; where $CDBI_{50}$ is the composition distribution breadth index, $\delta_{XO}$ is the crossover phase angle at a frequency of 1.0 rad/s, a is the CY a parameter, $\sigma^{MS}$ is the accelerated haul-off melt strength determined at 190° C., and $G^*_{XO}$ is the crossover complex modulus at a frequency of 1.0 rad/s.

In an embodiment of the disclosure, a process for making an ethylene/1-butene copolymer is provided, the process comprising polymerizing ethylene and 1-butene with a single site catalyst system in a gas phase polymerization reactor, wherein the ethylene/1-butene copolymer has a density of from 0.912 to 0.94 g/cm³, a melt index ($I_2$) of from 0.5 to 10 g/10 min, a melt flow ratio ($I_{21}/I_2$) of from 20 to 35, a molecular weight distribution ($M_w/M_n$) of from 2.0 to 4.5, and which has an accelerated haul-off melt strength ($\sigma^{MS}$) as determined by Rosand capillary rheometry at 190° C., of at least 3.0 cN, and which satisfies the following relationship:

$$(CDBI_{50}/\delta_{XO})^{3.0} \leq 6.5 - 5.7 \log [a(1.5(I_{21}/I_2) + (M_w/M_n))];$$

where $CDBI_{50}$ is the composition distribution breadth index, $\delta_{XO}$ is the crossover phase angle at a frequency of 1.0 rad/s and a is the CY a parameter.

In an embodiment of the disclosure, a process for making an ethylene/1-butene copolymer is provided, the process comprising polymerizing ethylene and 1-butene with a single site catalyst system in a gas phase polymerization reactor, wherein the ethylene/1-butene copolymer has a density of from 0.912 to 0.94 g/cm³, a melt index ($I_2$) of from 0.5 to 10 g/10 min, a melt flow ratio ($I_{21}/I_2$) of from 20 to 35, a molecular weight distribution ($M_w/M_n$) of from 2.0 to 4.5, and which has an accelerated haul-off melt strength ($\sigma^{MS}$) as determined by Rosand capillary rheometry at 190° C., of at least 3.0 cN, and which satisfies the following relationships: $(CDBI_{50}/\delta_{XO})^{3.0} \leq 6.5 - 5.7 \log [a(1.5(I_{21}/I_2) + (M_w/M_n))]$ and $\sigma^{MS} \geq 5.0 \times 10^{-4} \times G^*_{XO}$; where $CDBI_{50}$ is the composition distribution breadth index, $\delta_{XO}$ is the crossover phase angle at a frequency of 1.0 rad/s, a is the CY a parameter, $\sigma^{MS}$ is the accelerated haul-off melt strength determined at 190° C., and $G^*_{XO}$ is the crossover complex modulus at a frequency of 1.0 rad/s.

In an embodiment of the disclosure, a film structure is provided, the film structure comprising a film layer made from an ethylene/1-butene copolymer wherein the ethylene/1-butene copolymer is made by polymerizing ethylene and 1-butene with a single site catalyst system in a polymerization reactor, the ethylene copolymer having density of from 0.912 to 0.94 g/cm$^3$, a melt index ($I_2$) of from 0.5 to 10 g/10 min, a melt flow ratio ($I_{21}/I_2$) of from 20 to 35, a molecular weight distribution ($M_w/M_n$) of from 2.0 to 4.5, and an accelerated haul-off melt strength ($\sigma^{MS}$) as determined by Rosand capillary rheometry at 190° C., of at least 3.0 cN.

In an embodiment of the disclosure, a film structure is provided, the film structure comprising a film layer made from an ethylene/1-butene copolymer wherein the ethylene/1-butene copolymer is made by polymerizing ethylene and 1-butene with a single site catalyst system in a polymerization reactor, the ethylene/1-butene copolymer having density of from 0.912 to 0.94 g/cm$^3$, a melt index ($I_2$) of from 0.5 to 10 g/10 min, a melt flow ratio ($I_{21}/I_2$) of from 20 to 35, a molecular weight distribution ($M_w/M_n$) of from 2.0 to 4.5, and which satisfies the following relationship:

$$(CDBI_{50}/\delta_{XO})^{3.0} \leq 6.5-5.7 \log [a(1.5(I_{21}/I_2)+(M_w/M_n))];$$

where $CDBI_{50}$ is the composition distribution breadth index, $\delta_{XO}$ is the crossover phase angle at a frequency of 1.0 rad/s and a is the CY a parameter.

THE POLYMERIZATION CATALYST SYSTEM

Figure 1:
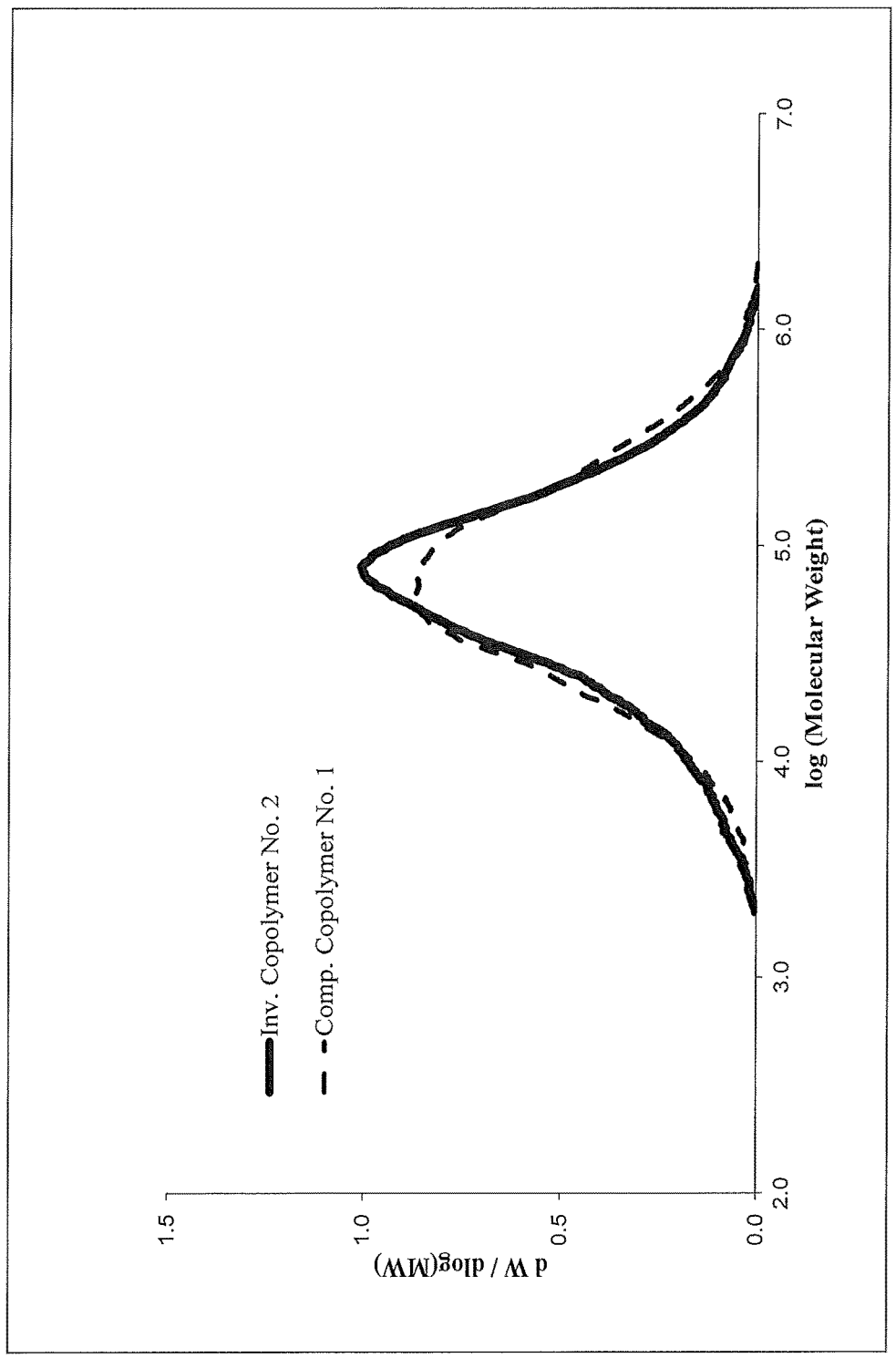
FIG. 1 shows a gel permeation chromatograph (GPC) with refractive index detection of an inventive and comparative ethylene/1-butene copolymer.
Figure 2:
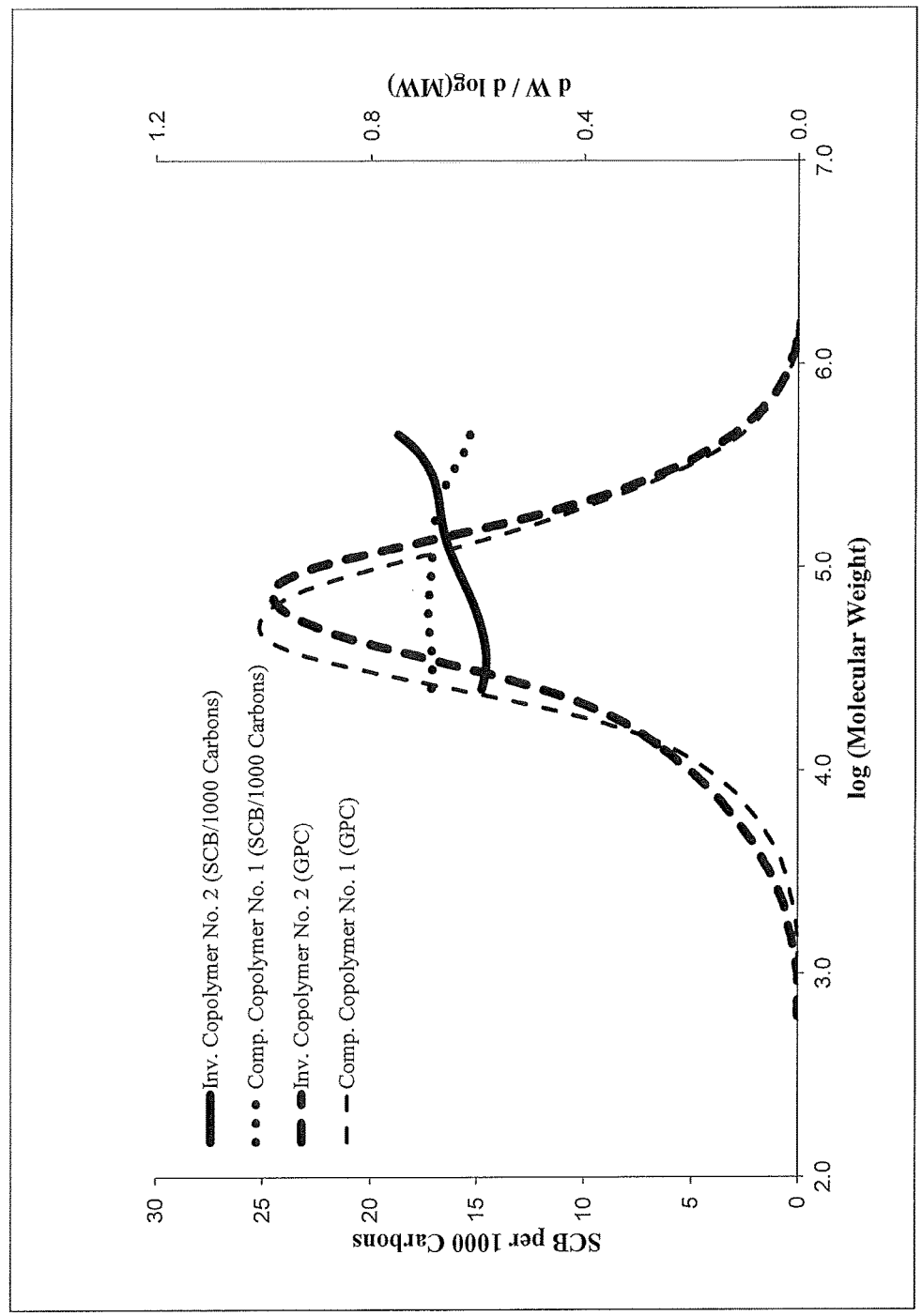
FIG. 2 shows a gel permeation chromatograph with Fourier transform infra-red (GPC-FTIR) detection obtained for an ethylene/1-butene copolymer made according to the present disclosure as well as for a comparative ethylene/1-butene copolymer. The comonomer content, shown as the number of short chain branches per 1000 carbons (y-axis), is given relative to the copolymer molecular weight (x-axis). The upwardly sloping line (from left to right) is the short chain branching (in short chain branches per 1000 carbons atoms) determined by FTIR. As can be seen in the Figure, for the inventive ethylene/1-butene copolymer the number of short chain branches increases at higher molecular weights, and hence the comonomer incorporation is said to be "reversed." For the comparative ethylene/1-butene copolymer the number of short chain branches decreases at higher molecular weights, and hence the comonomer incorporation is said to be "normal."
Figure 3:
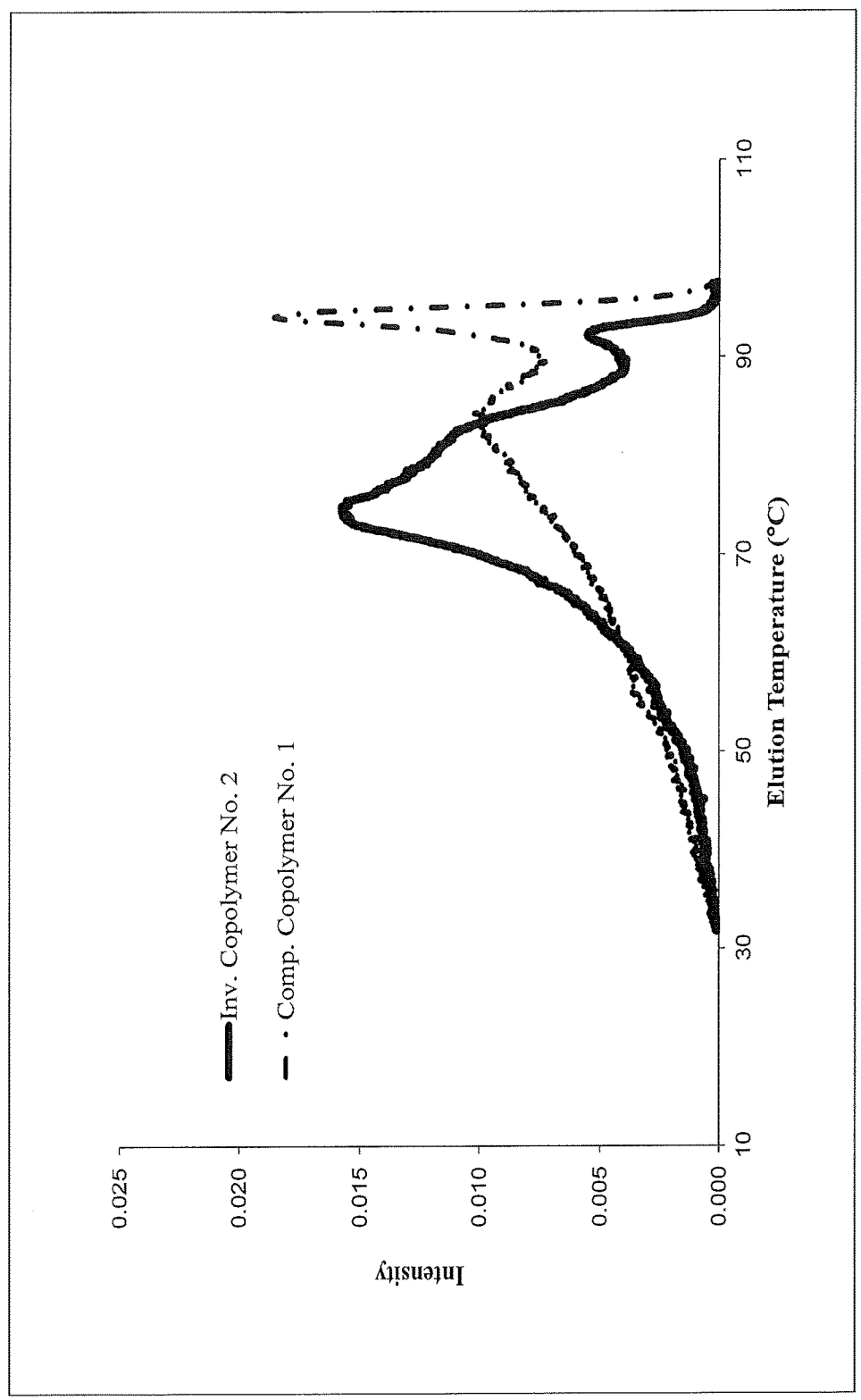
FIG. 3 shows a temperature rising elution fractionation (TREF) analysis and profile of an inventive and comparative ethylene/1-butene copolymer.
Figure 4:
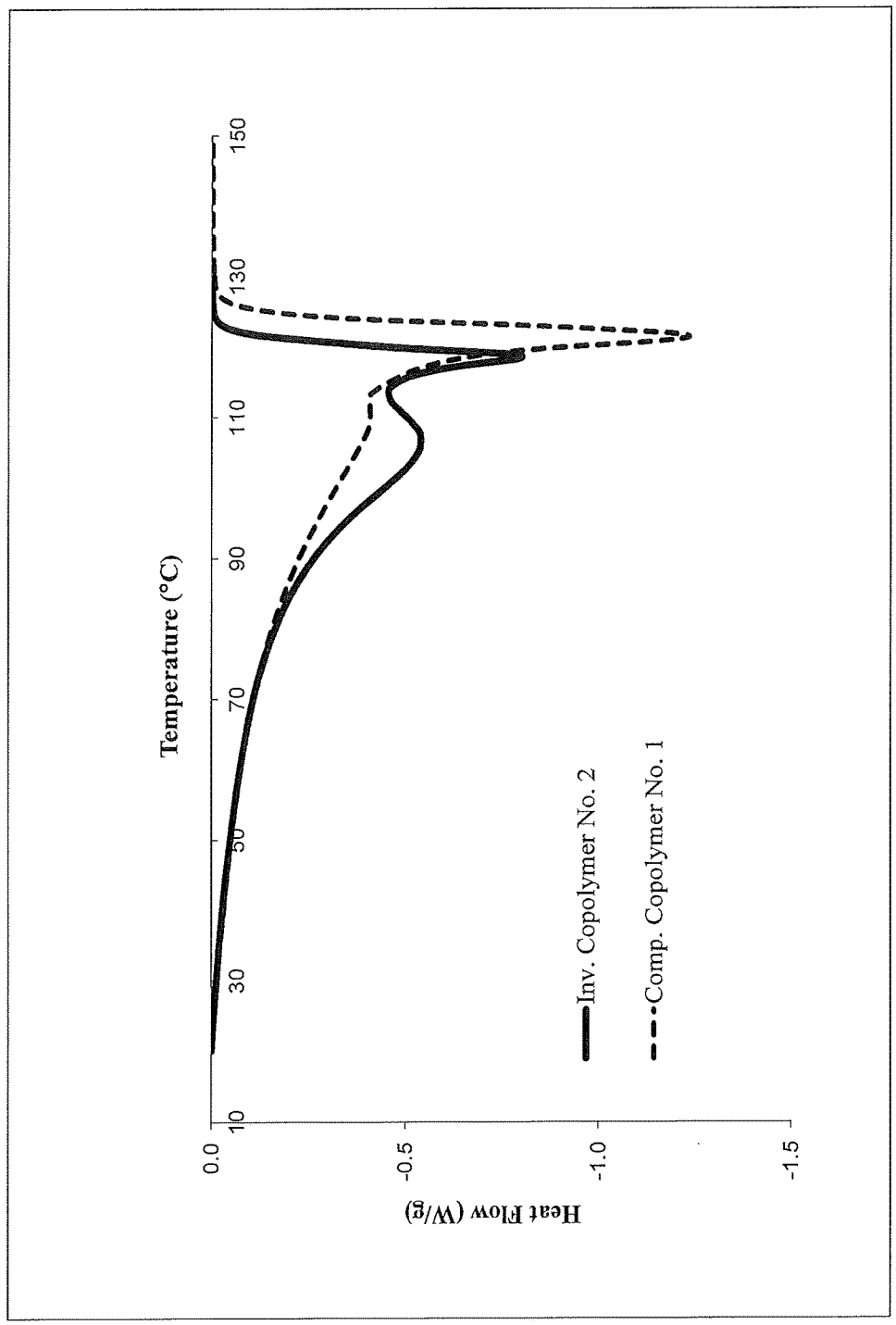
FIG. 4 shows a differential scanning calorimetry (DSC) of an inventive and comparative ethylene/1-butene copolymer.

A polymerization catalyst system must comprise a polymerization active catalyst component (the "polymerization catalyst"), but may also comprise other components such as but not limited to a catalyst activator (also known as a cocatalyst), a catalyst modifier, and an inert support. A polymerization catalyst system comprising a single site catalyst as the polymerization active component is herein referred to as a "single site catalyst system."

The Single Site Catalyst

The polymerization catalysts usefully employed in the present disclosure are single site catalysts. Suitable single site catalysts are metallocene catalysts, constrained geometry catalysts and phosphinimine catalysts all of which are polymerization active organometallic compounds well known to persons skilled in the relevant art. Some non-limiting examples of metallocene catalysts can be found in U.S. Pat. Nos. 4,808,561; 4,701,432; 4,937,301; 5,324,800; 5,633,394; 4,935,397; 6,002,033 and 6,489,413. Some non-limiting examples of constrained geometry catalysts can be found in U.S. Pat. Nos. 5,057,475; 5,096,867; 5,064,802; 5,132,380; 5,703,187 and 6,034,021. Some non-limiting examples of phosphinimine catalysts can be found in U.S. Pat. Nos. 6,342,463; 6,235,672; 6,372,864; 6,984,695; 6,063,879; 6,777,509 and 6,277,931. Other single site catalysts known in the art may also be used in the process of the present disclosure (e.g., catalysts comprising phenoxyimine and similar closely related ligands such as those described in U.S. Pat. Nos. 6,309,997; 6,399,724; 6,770,723 and 6,593,266; and catalysts comprising bidentate or tridentate ligands having a group 15 atom such as those described in U.S. Pat. Nos. 6,274,684; 6,689,847; 6,583,083; 6,300,438; 6,417,304; 6,300,439; 6,271,325; 6,320,002; 6,303,719; and 6,103,657).

In some embodiments the single site catalyst is based on a group 3, 4 or 5 metal (where the numbers refer to columns in the Periodic Table of the Elements using IUPAC nomenclature). In other embodiments single site catalysts are based on metals from group 4, which includes titanium, hafnium and zirconium. In some embodiments, the most preferred single site catalysts are group 4 metal complexes in their highest oxidation state.

The single site catalysts described herein, usually require activation by one or more cocatalytic or activator species in order to provide polymer. Hence, single site catalysts are sometimes called "pre-catalysts."

Particularly Suitable for Use in the Present Disclosure are Phosphinimine catalysts which are further described below.

The Phosphinimine Catalyst

In some embodiments the phosphinimine catalyst is based on transition metals from group 4, which includes titanium, hafnium and zirconium. In some embodiments, the most preferred phosphinimine catalysts are group 4 metal complexes in their highest oxidation state.

The phosphinimine catalysts described herein, usually require activation by one or more cocatalytic or activator species in order to provide polymer from olefins.

A phosphinimine catalyst is a compound (for example, an organometallic compound) based on a group 3, 4 or 5 metal and which is characterized as having at least one phosphinimine ligand. Any compounds/complexes having a phosphinimine ligand and which display catalytic activity for ethylene (co)polymerization may be called "phosphinimine catalysts."

In an embodiment of the disclosure, a phosphinimine catalyst is defined by the formula: $(L)_n(Pl)_mMX_p$ where M is a transition metal selected from Ti, Hf, Zr; Pl is a phosphinimine ligand; L is a cyclopentadienyl-type ligand; X is an activatable ligand; m is 1 or 2; n is 0 or 1; and p is determined by the valency of the metal M. In one embodiment, m is 1, n is 1 and p is 2.

In an embodiment of the disclosure, a phosphinimine catalyst is defined by the formula: $(L)(Pl)MX_2$ where M is a transition metal selected from Ti, Hf, Zr; Pl is a phosphinimine ligand; L is a cyclopentadienyl-type ligand; and X is an activatable ligand.

The phosphinimine ligand is defined by the formula: $R_3P=N—$, where N bonds to the metal, and wherein each R is independently selected from a hydrogen atom; a halogen atom; $C_{1-20}$ hydrocarbyl radicals which are unsubstituted or further substituted by one or more halogen atom and/or $C_{1-20}$ alkyl radical; $C_{1-8}$ alkoxy radical; $C_{6-10}$ aryl or aryloxy radical (the aryl or aryloxy radical optionally being unsubstituted or further substituted by one or more halogen atom and/or $C_{1-20}$ alkyl radical); amido radical; silyl radical of the formula: $—SiR'_3$ wherein each R' is independently selected from hydrogen, a $C_{1-8}$ alkyl or alkoxy radical, $C_{6-10}$ aryl or aryloxy radicals; and germanyl radical of the formula: $—GeR'_3$ wherein R' is as defined above.

In an embodiment of the disclosure, the phosphinimine ligand is chosen so that each R is a hydrocarbyl radical. In a particular embodiment of the disclosure, the phosphinimine ligand is tri-(tertiarybutyl)phosphinimine (i.e., where each R is a tertiary butyl group, or "t-Bu" for short).

In an embodiment of the disclosure, the phosphinimine catalyst is a group 4 compound/complex which contains one phosphinimine ligand (as described above) and one ligand L which is a cyclopentadienyl-type ligand.

As used herein, the term "cyclopentadienyl-type" ligand is meant to include ligands which contain at least one five-carbon ring which is bonded to the metal via eta-5 (or in some cases eta-3) bonding. Thus, the term "cyclopentadienyl-type" includes, for example, unsubstituted cyclopentadienyl, singly or multiply substituted cyclopentadienyl, unsubstituted indenyl, singly or multiply substituted indenyl, unsubstituted fluorenyl and singly or multiply substituted fluorenyl. Hydrogenated versions of indenyl and fluorenyl ligands are also contemplated for use in the current disclosure, so long as the five-carbon ring which bonds to the metal via eta-5 (or in some cases eta-3) bonding remains intact. Substituents for a cyclopentadienyl ligand, an indenyl ligand (or hydrogenated version thereof) and a fluorenyl ligand (or hydrogenated version thereof) may be selected from a $C_{1-30}$ hydrocarbyl radical (which hydrocarbyl radical may be unsubstituted or further substituted by for example a halide and/or a hydrocarbyl group; for example a suitable substituted $C_{1-30}$ hydrocarbyl radical is a pentafluorobenzyl group such as: $—CH_2C_6F_5$); a halogen atom; a $C_{1-8}$ alkoxy radical; a $C_{6-10}$ aryl or aryloxy radical (each of which may be further substituted by for example a halide and/or a hydrocarbyl group; for example a suitable $C_{6-10}$ aryl group is a perfluoroaryl group such as: $—C_6F_5$); an amido radical which is unsubstituted or substituted by up to two $C_{1-8}$ alkyl radicals; a phosphido radical which is unsubstituted or substituted by up to two $C_{1-8}$ alkyl radicals; a silyl radical of the formula $—Si(R')_3$ wherein each R' is independently selected from hydrogen, a $C_{1-8}$ alkyl or alkoxy radical, $C_{6-10}$ aryl or aryloxy radicals; and a germanyl radical of the formula $—Ge(R')_3$ wherein R' is as defined directly above.

The term "activatable ligand" refers to a ligand which may be activated by a cocatalyst (also referred to as an "activator"), to facilitate olefin polymerization. An activatable ligand X may be cleaved from the metal center M via a protonolysis reaction or abstracted from the metal center M by suitable acidic or electrophilic catalyst activator compounds (also known as "co-catalyst" compounds) respectively, examples of which are described below. The activatable ligand X may also be transformed into another ligand which is cleaved or abstracted from the metal center M (e.g., a halide may be converted to an alkyl group). Without wishing to be bound by any single theory, protonolysis or abstraction reactions generate an active "cationic" metal center which can polymerize olefins. In embodiments of the present disclosure, the activatable ligand, X is independently selected from a hydrogen atom; a halogen atom; a $C_{1-10}$ hydrocarbyl radical; a $C_{1-10}$ alkoxy radical; a $C_{6-10}$ aryl oxide radical, each of which said hydrocarbyl, alkoxy, and aryl oxide radicals may be unsubstituted by or further substituted by a halogen atom, a $C_{1-8}$ alkyl radical, a $C_{1-8}$ alkoxy radical, a $C_{6-10}$ aryl or aryloxy radical; an amido radical which is unsubstituted or substituted by up to two $C_{1-8}$ alkyl radicals; and a phosphido radical which is unsubstituted or substituted by up to two $C_{1-8}$ alkyl radicals. Two activatable X ligands may also be joined to one another and form for example, a substituted or unsubstituted diene ligand (i.e., 1,3-diene); or a delocalized heteroatom containing group such as an acetate group.

The number of activatable ligands depends upon the valency of the metal and the valency of the activatable ligand. In some embodiments, the preferred phosphinimine catalysts are based on group 4 metals in their highest oxidation state (i.e., $4^+$). Example activatable ligands are monoanionic such as a halide (e.g., chloride) or a hydrocarbyl (e.g., methyl, benzyl).

In some instances, the metal of the phosphinimine catalyst may not be in the highest oxidation state. For example, a titanium (III) component would contain only one activatable ligand.

In an embodiment of the disclosure, the phosphinimine catalyst has the formula, $(L)(Pl)MX_2$, where M is Ti, Zr or Hf; Pl is a phosphinimine ligand having the formula $R_3P=N—$, where R is independently selected from hydrogen, halogen, and $C_1$-$C_{20}$ hydrocarbyl; L is a ligand selected from cyclopentadienyl, substituted cyclopentadienyl, indenyl, substituted indenyl, fluorenyl, and substituted fluorenyl; and X is an activatable ligand.

In an embodiment of the disclosure, the phosphinimine catalyst has the formula: $(L)((t-Bu)_3P=N)TiX_2$, where L is a ligand selected from cyclopentadienyl, substituted cyclopentadienyl, indenyl, and substituted indenyl; and X is an activatable ligand.

In an embodiment of the disclosure, the phosphinimine catalyst has the formula: (L)((t-Bu)$_3$P=N)TiX$_2$, where L is a ligand selected from a substituted cyclopentadienyl and substituted indenyl; and X is an activatable ligand.

In an embodiment of the disclosure, the phosphinimine catalyst contains a phosphinimine ligand, a cyclopentadienyl ligand ("Cp" for short) and two chloride or two methyl ligands bonded to the group 4 metal.

In an embodiment of the disclosure, the phosphinimine catalyst contains a phosphinimine ligand, a singly or multiply substituted cyclopentadienyl ligand and two chloride or two methyl ligands bonded to the group 4 metal.

In an embodiment of the disclosure, the phosphinimine catalyst contains a phosphinimine ligand, a perfluoroaryl substituted cyclopentadienyl ligand and two chloride or two methyl ligands bonded to the group 4 metal.

In an embodiment of the disclosure, the phosphinimine catalyst contains a phosphinimine ligand, a perfluorophenyl substituted cyclopentadienyl ligand (i.e., Cp-C$_6$F$_5$) and two chloride or two methyl ligands bonded to the group 4 metal.

In an embodiment of the disclosure, the phosphinimine catalyst contains a 1,2-substituted cyclopentadienyl ligand and a phosphinimine ligand which is substituted by three tertiary butyl substituents.

In an embodiment of the disclosure, the phosphinimine catalyst contains a 1,2 substituted cyclopentadienyl ligand (e.g., a 1,2-(R*)(Ar—F)Cp) where the substituents are selected from R* a hydrocarbyl group, and Ar—F a perfluorinated aryl group, a 2,6 (i.e., ortho) fluoro substituted phenyl group, a 2,4,6 (i.e., ortho/para) fluoro substituted phenyl group, or a 2,3,5,6 (i.e., ortho/meta) fluoro substituted phenyl group respectively.

In the present disclosure, 1,2 substituted cyclopentadienyl ligands such as for example 1,2-(R*)(Ar—F)Cp ligands may contain as impurities 1,3 substituted analogues such as for example 1,3-(R*)(Ar—F)Cp ligands. Hence, phosphinimine catalysts having a 1,2 substituted Cp ligand may contain as an impurity, a phosphinimine catalyst having a 1,3 substituted Cp ligand. Alternatively, the current disclosure contemplates the use of 1,3 substituted Cp ligands as well as the use of mixtures of varying amounts of 1,2 and 1,3 substituted Cp ligands to give phosphinimine catalysts having 1,3 substituted Cp ligands or mixed phosphinimine catalysts having 1,2 and 1,3 substituted Cp ligands.

In an embodiment of the disclosure, the phosphinimine catalyst has the formula: (1,2-(R*)(Ar—F)Cp)M(N=P(t-Bu)$_3$)X$_2$ where R* is a hydrocarbyl group; Ar—F is a perfluorinated aryl group, a 2,6 (i.e., ortho) fluoro substituted phenyl group, a 2,4,6 (i.e., ortho/para) fluoro substituted phenyl group, or a 2,3,5,6 (i.e., ortho/meta) fluoro substituted phenyl group; M is Ti, Zr or Hf; and X is an activatable ligand. In an embodiment of the disclosure, the phosphinimine catalyst has the formula: (1,2-(R*)(Ar—F)Cp)M(N=P(t-Bu)$_3$)X$_2$ where R* is an alkyl group; Ar—F is a perfluorinated aryl group, a 2,6 (i.e., ortho) fluoro substituted phenyl group, a 2,4,6 (i.e., ortho/para) fluoro substituted phenyl group or a 2,3,5,6 (i.e., ortho/meta) fluoro substituted phenyl group; M is Ti, Zr or Hf; and X is an activatable ligand. In an embodiment of the disclosure, the phosphinimine catalyst has the formula: (1,2-(R*)(Ar—F)Cp)M(N=P(t-Bu)$_3$)X$_2$ where R* is a hydrocarbyl group having from 1 to 20 carbons; Ar—F is a perfluorinated aryl group; M is Ti, Zr or Hf; and X is an activatable ligand. In an embodiment of the disclosure, the phosphinimine catalyst has the formula: (1,2-(R*)(Ar—F)Cp)M(N=P(t-Bu)$_3$)X$_2$ where R* is a straight chain alkyl group; Ar—F is a perfluorinated aryl group, a 2,6 (i.e. ortho) fluoro substituted phenyl group, a 2,4,6 (i.e., ortho/para) fluoro substituted phenyl group, or a 2,3,5,6 (i.e., ortho/meta) fluoro substituted phenyl group; M is Ti, Zr or Hf; and X is an activatable ligand. In an embodiment of the disclosure, the phosphinimine catalyst has the formula: (1,2-(n-R*)(Ar—F)Cp)Ti(N=P(t-Bu)$_3$)X$_2$ where R* is a straight chain alkyl group; Ar—F is a perfluorinated aryl group; M is Ti, Zr or Hf; and X is an activatable ligand. In an embodiment of the disclosure, the phosphinimine catalyst has the formula: (1,2-(R*)(C$_6$F$_5$)Cp)M(N=P(t-Bu)$_3$)X$_2$ where R* is a hydrocarbyl group having 1 to 20 carbon atoms; M is Ti, Zr or Hf; and X is an activatable ligand. In an embodiment of the disclosure, the phosphinimine catalyst has the formula: (1,2-(n-R*)(C$_6$F$_5$)Cp)M(N=P(t-Bu)$_3$)X$_2$ where R* is a straight chain alkyl group; M is Ti, Zr or Hf; and X is an activatable ligand. In further embodiments, M is Ti and R* is any one of a methyl, ethyl, n-propyl, n-butyl, n-pentyl, n-hexyl, n-heptyl, and n-octyl group. In further embodiments, X is chloride or methide.

The term "perfluorinated aryl group" means that each hydrogen atom attached to a carbon atom in an aryl group has been replaced with a fluorine atom as is well understood in the art (e.g., a perfluorinated phenyl group or substituent has the formula —C$_6$F$_5$). In embodiments of the disclosure, Ar—F is selected from the group comprising perfluorinated phenyl or perfluorinated naphthyl groups.

Some phosphinimine catalysts which may be used in the present disclosure include: ((C$_6$F$_5$)Cp)Ti(N=P(t-Bu)$_3$)Cl$_2$; (1,2-(n-propyl)(C$_6$F$_5$)Cp)Ti(N=P(t-Bu)$_3$)Cl$_2$, (1,2-(n-butyl)(C$_6$F$_5$)Cp)Ti(N=P(t-Bu)$_3$)Cl$_2$ and (1,2-(n-hexyl)(C$_6$F$_5$)Cp)Ti(N=P(t-BU)$_3$)Cl$_2$.

In an embodiment of the disclosure, the phosphinimine catalyst will have a single or multiply substituted indenyl ligand and a phosphinimine ligand which is substituted by three tertiary butyl substituents.

An indenyl ligand (or "Ind" for short) as defined in the present disclosure will have framework carbon atoms with the numbering scheme provided below, so the location of a substituent can be readily identified.

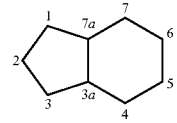

In an embodiment of the disclosure, the phosphinimine catalyst will have a singly substituted indenyl ligand and a phosphinimine ligand which is substituted by three tertiary butyl substituents.

In an embodiment of the disclosure, the phosphinimine catalyst will have a singly or multiply substituted indenyl ligand where the substituent is selected from a substituted or unsubstituted alkyl group, a substituted or an unsubstituted aryl group, and a substituted or unsubstituted benzyl (e.g., C$_6$H$_5$CH$_2$—) group. Suitable substituents for the alkyl, aryl or benzyl group may be selected from alkyl groups, aryl groups, alkoxy groups, aryloxy groups, alkylaryl groups (e.g., a benzyl group), arylalkyl groups and halide groups.

In an embodiment of the disclosure, the phosphinimine catalyst will have a singly substituted indenyl ligand, R$^¥$-Indenyl, where the R$^¥$ substituent is a substituted or unsubstituted alkyl group, a substituted or an unsubstituted aryl group, or a substituted or unsubstituted benzyl group. Suitable substituents for an R$^¥$ alkyl, R$^¥$ aryl or R$^¥$ benzyl group may be selected from alkyl groups, aryl groups, alkoxy groups, aryloxy groups, alkylaryl groups (e.g., a benzyl group), arylalkyl groups and halide groups.

In an embodiment of the disclosure, the phosphinimine catalyst will have an indenyl ligand having at least a 1-position substituent (1-$R^¥$) where the substituent $R^¥$ is a substituted or unsubstituted alkyl group, a substituted or an unsubstituted aryl group, or a substituted or unsubstituted benzyl group. Suitable substituents for an $R^¥$ alkyl, $R^¥$ aryl or $R^¥$ benzyl group may be selected from alkyl groups, aryl groups, alkoxy groups, aryloxy groups, alkylaryl groups (e.g., a benzyl group), arylalkyl groups and halide groups.

In an embodiment of the disclosure, the phosphinimine catalyst will have a singly substituted indenyl ligand, 1-$R^¥$-Indenyl where the substituent $R^¥$ is in the 1-position of the indenyl ligand and is a substituted or unsubstituted alkyl group, a substituted or unsubstituted aryl group, or a substituted or an unsubstituted benzyl group. Suitable substituents for an $R^¥$ alkyl, $R^¥$ aryl or $R^¥$ benzyl group may be selected from alkyl groups, aryl groups, alkoxy groups, aryloxy groups, alkylaryl groups (e.g., a benzyl group), arylalkyl groups and halide groups.

In an embodiment of the disclosure, the phosphinimine catalyst will have a singly substituted indenyl ligand, 1-$R^¥$-Indenyl, where the substituent $R^¥$ is a (partially/fully) halide substituted alkyl group, a (partially/fully) halide substituted benzyl group, or a (partially/fully) halide substituted aryl group.

In an embodiment of the disclosure, the phosphinimine catalyst will have a singly substituted indenyl ligand, 1-$R^¥$-Indenyl, where the substituent $R^¥$ is a (partially/fully) halide substituted benzyl group.

When present on an indenyl ligand, a benzyl group can be partially or fully substituted by halide atoms, for example, fluoride atoms. The aryl group of the benzyl group may be a perfluorinated aryl group, a 2,6 (i.e., ortho) fluoro substituted phenyl group, 2,4,6 (i.e., ortho/para) fluoro substituted phenyl group or a 2,3,5,6 (i.e., ortho/meta) fluoro substituted phenyl group respectively. The benzyl group is, in an embodiment of the disclosure, located at the 1 position of the indenyl ligand.

In an embodiment of the disclosure, the phosphinimine catalyst will have a singly substituted indenyl ligand, 1-$R^¥$-Indenyl, where the substituent $R^¥$ is a pentafluorobenzyl ($C_6F_5CH_2$—) group.

In an embodiment of the disclosure, the phosphinimine catalyst has the formula: $(1\text{-}R^¥\text{-}(Ind))M(N=P(t\text{-}Bu)_3)X_2$ where $R^¥$ is a substituted or unsubstituted alkyl group, a substituted or an unsubstituted aryl group, or a substituted or unsubstituted benzyl group, wherein substituents for the alkyl, aryl or benzyl group are selected from alkyl, aryl, alkoxy, aryloxy, alkylaryl, arylalkyl and halide substituents; M is Ti, Zr or Hf; and X is an activatable ligand.

In an embodiment of the disclosure, the phosphinimine catalyst has the formula: $(1\text{-}R^¥\text{-}(Ind))M(N=P(t\text{-}Bu)_3)X_2$ where $R^¥$ is an alkyl group, an aryl group or a benzyl group and wherein each of the alkyl group, the aryl group, and the benzyl group may be unsubstituted or substituted by at least one fluoride atom; M is Ti, Zr or Hf; and X is an activatable ligand.

In an embodiment of the disclosure, the phosphinimine catalyst has the formula: $(1\text{-}R^¥\text{-}(Ind))M(N=P(t\text{-}Bu)_3)X_2$ where $R^¥$ is an alkyl group, an aryl group or a benzyl group and wherein each of the alkyl group, the aryl group, and the benzyl group may be unsubstituted or substituted by at least one halide atom; M is Ti, Zr or Hf; and X is an activatable ligand.

In an embodiment of the disclosure, the phosphinimine catalyst has the formula: $(1\text{-}R^¥\text{-}(Ind))Ti(N=P(t\text{-}Bu)_3)X_2$ where $R^¥$ is an alkyl group, an aryl group or a benzyl group and wherein each of the alkyl group, the aryl group, and the benzyl group may be unsubstituted or substituted by at least one fluoride atom; and X is an activatable ligand.

In an embodiment of the disclosure, the phosphinimine catalyst has the formula: $(1\text{-}C_6F_5CH_2\text{-}Ind)M(N=P(t\text{-}Bu)_3)X_2$, where M is Ti, Zr or Hf; and X is an activatable ligand.

In an embodiment of the disclosure, the phosphinimine catalyst has the formula: $(1\text{-}C_6F_5CH_2\text{-}Ind)Ti(N=P(t\text{-}Bu)_3)X_2$, where X is an activatable ligand.

In an embodiment of the disclosure, the phosphinimine catalyst has the formula: $(1\text{-}C_6F_5CH_2\text{-}Ind)Ti(N=P(t\text{-}Bu)_3)Cl_2$.

The Cocatalyst

In the present disclosure, the single site catalyst is used in combination with at least one activator (or "cocatalyst") to form an active polymerization catalyst system for olefin polymerization. Activators (i.e., cocatalysts) include ionic activator cocatalysts and hydrocarbyl aluminoxane cocatalysts.

The activator used to activate the single site catalyst can be any suitable activator including one or more activators selected from alkylaluminoxanes and ionic activators, optionally together with an alkylating agent.

Without wishing to be bound by theory, the alkylaluminoxanes are complex aluminum compounds of the formula: $R^3_2Al^1O(R^3Al^1O)_mAl^1R^3_2$, wherein each $R^3$ is independently selected from $C_{1-20}$ hydrocarbyl radicals and m is from 3 to 50. Optionally, a hindered phenol can be added to the alkylaluminoxane to provide a molar ratio of $Al^1$:hindered phenol of from 2:1 to 5:1 when the hindered phenol is present.

In an embodiment of the disclosure, $R^3$ of the alkylaluminoxane, is a methyl radical and m is from 10 to 40.

The alkylaluminoxanes may be used in substantial molar excess compared to the amount of group 4 transition metal in the single site catalyst. The $Al^1$:group 4 transition metal molar ratios are from 10:1 to 10,000:1, for example, about 30:1 to about 500:1.

It is well known in the art, that the alkylaluminoxane can serve dual roles as both an alkylator and an activator. Hence, an alkylaluminoxane activator is often used in combination with activatable ligands such as halogens.

Alternatively, the activator of the present disclosure may be a combination of an alkylating agent (which may also serve as a scavenger) with an activator capable of ionizing the group 4 metal of the single site catalyst (i.e., an ionic activator). In this context, the activator can be chosen from one or more alkylaluminoxane and/or an ionic activator.

When present, the alkylating agent may be selected from $(R^4)_pMgX^2_{2-p}$ wherein $X^2$ is a halide and each $R^4$ is independently selected from $C_{1-10}$ alkyl radicals and p is 1 or 2; $R^4Li$ wherein in $R^4$ is as defined above, $(R^4)_qZnX^2_{2-q}$ wherein $R^4$ is as defined above, $X^2$ is halogen and q is 1 or 2; $(R^4)_sAl^2X^2_{3-s}$ wherein $R^4$ is as defined above, $X^2$ is halogen and s is an integer from 1 to 3. In some embodiments in the above compounds $R^4$ is a $C_{1-4}$ alkyl radical, and $X^2$ is chlorine. Commercially available compounds include triethyl aluminum (TEAL), diethyl aluminum chloride (DEAC), dibutyl magnesium (($Bu)_2Mg$), and butyl ethyl magnesium (BuEtMg or BuMgEt).

The ionic activator may be selected from: (i) compounds of the formula $[R^5]+[B(R^6)_4]^-$ wherein B is a boron atom, $R^5$ is a cyclic $C_{5-7}$ aromatic cation or a triphenyl methyl cation and each $R^6$ is independently selected from phenyl radicals which are unsubstituted or substituted with from 3 to 5 substituents selected from a fluorine atom, a $C_{1-4}$ alkyl or alkoxy radical which is unsubstituted or substituted by a fluorine atom; and a silyl radical of the formula —Si—$(R^7)_3$; wherein each $R^7$ is independently selected from a hydrogen atom and a $C_{1-4}$ alkyl radical; and (ii) compounds of the formula $[(R^8)_tZH]^+[B(R^6)_4]^-$ wherein B is a boron atom, H is a hydrogen atom, Z is a nitrogen atom or phosphorus atom, t is 2 or 3 and $R^8$ is selected from $C_{1-8}$ alkyl radicals, a phenyl radical which is unsubstituted or substituted by up to three $C_{1-4}$ alkyl radicals, or one $R^8$ taken together with a nitrogen atom may form an anilinium radical and $R^6$ is as defined above; and (iii) compounds of the formula $B(R^6)_3$ wherein $R^6$ is as defined above.

In some embodiments, in the above compounds $R^6$ is a pentafluorophenyl radical, and $R^5$ is a triphenylmethyl cation, Z is a nitrogen atom and $R^8$ is a $C_{1-4}$ alkyl radical or one $R^8$ taken together with a nitrogen atom forms an anilinium radical (e.g. $PhR^8{}_2NH^+$, which is substituted by two $R^8$ radicals such as for example two $C_{1-4}$ alkyl radicals).

Examples of compounds capable of ionizing the single site catalyst include the following compounds: triethylammonium tetra(phenyl)boron, tripropylammonium tetra(phenyl)boron, tri(n-butyl)ammonium tetra(phenyl)boron, trimethylammonium tetra(p-tolyl)boron, trimethylammonium tetra(o-tolyl)boron, tributylammonium tetra(pentafluorophenyl)boron, tripropylammonium tetra (o,p-dimethylphenyl)boron, tributylammonium tetra(m,m-dimethylphenyl) boron, tributylammonium tetra(p-trifluoromethylphenyl) boron, tributylammonium tetra(pentafluorophenyl)boron, tri (n-butyl)ammonium tetra (o-tolyl)boron, N,N-dimethylanilinium tetra(phenyl)boron, N,N-diethylanilinium tetra(phenyl)boron, N,N-diethylanilinium tetra(phenyl)n-butylboron, N,N-2,4,6-pentamethylanilinium tetra(phenyl)boron, di-(isopropyl)ammonium tetra(pentafluorophenyl)boron, dicyclohexylammonium tetra (phenyl) boron, triphenylphosphonium tetra)phenyl)boron, tri(methylphenyl)phosphonium tetra(phenyl)boron, tri (dimethylphenyl)phosphonium tetra(phenyl)boron, tropillium tetrakispentafluorophenyl borate, triphenylmethylium tetrakispentafluorophenyl borate, benzene (diazonium) tetrakispentafluorophenyl borate, tropillium phenyltrispentafluorophenyl borate, triphenylmethylium phenyltrispentafluorophenyl borate, benzene (diazonium) phenyltrispentafluorophenyl borate, tropillium tetrakis (2,3,5,6-tetrafluorophenyl) borate, triphenylmethylium tetrakis (2,3,5,6-tetrafluorophenyl) borate, benzene (diazonium) tetrakis (3,4,5-trifluorophenyl) borate, tropillium tetrakis (3,4,5-trifluorophenyl) borate, benzene (diazonium) tetrakis (3,4,5-trifluorophenyl) borate, tropillium tetrakis (1,2,2-trifluoroethenyl) borate, trophenylmethylium tetrakis (1,2,2-trifluoroethenyl) borate, benzene (diazonium) tetrakis (1,2,2-trifluoroethenyl) borate, tropillium tetrakis (2,3,4,5-tetrafluorophenyl) borate, triphenylmethylium tetrakis (2,3,4,5-tetrafluorophenyl) borate, and benzene (diazonium) tetrakis (2,3,4,5-tetrafluorophenyl) borate.

Commercially available activators which are capable of ionizing the group 4 metal of the single site catalyst include: N,N-dimethylaniliniumtetrakispenta-fluorophenyl borate ("[Me$_2$NHPh][B(C$_6$F$_5$)$_4$]"); triphenylmethylium tetrakispentafluorophenyl borate ("[Ph$_3$C][B(C$_6$F$_5$)$_4$]"); and tris-pentafluorophenyl boron and MAO (methylaluminoxane) and MMAO (modified methylaluminoxane).

The ionic activators compounds may be used in amounts which provide a molar ratio of group 4 transition metal to boron that will be from 1:1 to 1:6.

Optionally, mixtures of alkylaluminoxanes and ionic activators can be used as activators in the polymerization catalyst.

The Inert Support

In the present disclosure, the single site catalyst is supported on an inert support. The support used in the present disclosure can be any support known in the art to be suitable for use with polymerization catalysts. For example, the support can be any porous or non-porous support material, such as talc, inorganic oxides, inorganic chlorides, aluminophosphates (i.e. AlPO$_4$) and polymer supports (e.g., polystyrene, etc.). Example supports include Group 2, 3, 4, 5, 13 and 14 metal oxides, for example, silica, alumina, silica-alumina, magnesium oxide, magnesium chloride, zirconia, titania, clay (e.g., montmorillonite) and mixtures thereof.

Agglomerate supports such as agglomerates of silica and clay may also be used as a support in the current disclosure.

Supports may be used in calcined form. An inorganic oxide support, for example, will contain acidic surface hydroxyl groups which will react with a polymerization catalyst. Prior to use, the inorganic oxide may be dehydrated to remove water and to reduce the concentration of surface hydroxyl groups. Calcination or dehydration of a support is well known in the art. In embodiments of the disclosure, the support is calcined at temperatures above 200° C., or above 300° C., or above, 400° C., or above 500° C. In other embodiments, the support is calcined at from about 500° C. to about 1000° C., or from about 600° C. to about 900° C. The resulting support may be free of adsorbed water and may have a surface hydroxyl content from about 0.1 to 5 mmol/g of support, or from 0.5 to 3 mmol/g. The amount of hydroxyl groups in a silica support may be determined according to the method disclosed by J. B. Peri and A. L. Hensley Jr., in *J. Phys. Chem.*, 72 (8), 1968, pg 2926.

The support material, especially an inorganic oxide, such as silica for example, has a surface area of from about 10 to about 700 m$^2$/g, a pore volume in the range from about 0.1 to about 4.0 cc/g and an average particle size of from about 5 to about 500 µm. In a specific embodiment, the support material has a surface area of from about 50 to about 500 m$^2$/g, a pore volume in the range from about 0.5 to about 3.5 cc/g and an average particle size of from about 10 to about 200 µm. In another specific embodiment the support material has a surface area of from about 100 to about 400 m$^2$/g, a pore volume in the range from about 0.8 to about 3.0 cc/g and an average particle size of from about 5 to about 100 µm.

The support material, especially an inorganic oxide, such as silica, for example, has an average pore size (i.e., pore diameter) of from about 10 to about 1000 Angstroms (Å). In a specific embodiment, the support material has an average pore size of from about 50 to about 500 Å. In another specific embodiment, the support material has an average pore size of from about 75 to about 350 Å.

The surface area and pore volume of a support may be determined by nitrogen adsorption according to B.E.T. techniques, which are well known in the art and are described in the *Journal of the American Chemical Society*, 1938, v 60, pp. 309-319.

A silica support which is suitable for use in the present disclosure has a high surface area and is amorphous. By way of example, useful silicas are commercially available under the trademark of Sylopol® 958, 955 and 2408 from Davison Catalysts, a Division of W. R. Grace and Company and ES-70W by PQ Corporation.

Agglomerate supports comprising a clay mineral and an inorganic oxide, may be prepared using a number techniques well known in the art including pelletizing, extrusion, drying or precipitation, spray-drying, shaping into beads in a rotating coating drum, and the like. A nodulization technique may also be used. Methods to make agglomerate supports comprising a clay mineral and an inorganic oxide include spray-drying a slurry of a clay mineral and an inorganic oxide. Methods to make agglomerate supports comprising a clay mineral and an inorganic oxide are disclosed in U.S. Pat. Nos. 6,686,306; 6,399,535; 6,734,131; 6,559,090 and 6,968,375.

An agglomerate of clay and inorganic oxide which may be useful in the current disclosure may have the following properties: a surface area of from about 20 to about 800 $m^2/g$, for example, from 50 to about 600 $m^2/g$; particles with a bulk density of from about 0.15 to about 1 g/ml, for example, from about 0.20 to about 0.75 g/ml; an average pore diameter of from about 30 to about 300 Angstroms (Å), for example, from about 60 to about 150 Å; a total pore volume of from about 0.10 to about 2.0 cc/g, for example, from about 0.5 to about 1.8 cc/g; and an average particle size of from about 4 to 150 microns (µm), for example, from about 8 to 100 microns.

Optionally, a support, for example a silica support, may be treated with one or more salts of the type: $Zr(SO_4)_2.4H_2O$, $ZrO(NO_3)_2$, and $Fe(NO_3)_3$ as taught in CA Patent Application No. 2,716,772 to the same applicant. Supports that have been otherwise chemically treated are also contemplated for use with the catalysts and processes of the present disclosure.

Without wishing to be bound by theory, $Zr(SO_4)_2.4H_2O$ and $ZrO(NO_3)_2$ may each act as a source of zirconium oxide (i.e. $ZrO_2$) which may form for example after calcinations temperatures are employed. Alternately, the $Zr(SO_4)_2.4H_2O$ can be used to add $Zr(SO_4)_2$ to an inert support if suitably high calcinations temperatures (those which promote formation of zirconium oxide) are not employed.

The present disclosure is not limited to any particular procedure for supporting the single site catalyst or the cocatalyst. Processes for depositing a single site catalyst complex and/or a cocatalyst on a support are well known in the art (for some non-limiting examples of catalyst supporting methods, see "Supported Catalysts" by James H. Clark and Duncan J. Macquarrie, published online Nov. 15, 2002 in the Kirk-Othmer Encyclopedia of Chemical Technology Copyright © 2001 by John Wiley & Sons, Inc.; for some non-limiting methods to support a single site catalyst see U.S. Pat. No. 5,965,677). For example, the single site catalyst may be added to a support by co-precipitation with the support material. The cocatalyst can be added to a support before and/or after the single site catalyst or together with the single site catalyst (e.g. a phosphinimine catalyst may be mixed with a cocatalyst in a suitable solvent or diluents and the mixture added to a support). Optionally, the cocatalyst can be added to a supported single site catalyst in situ or on route to a reactor. The single site catalyst and/or cocatalyst may be slurried or dissolved in a suitable diluent or solvent respectively and then added to a support. Suitable solvents or diluents include but are not limited to hydrocarbons and mineral oil. The single site catalyst may be added to the solid support, in the form of a solid, solution or slurry, followed by the addition of the cocatalyst in solid form or as a solution or slurry. The cocatalyst may be added to the solid support, in the form of a solid, solution or slurry, followed by the addition of the single site catalyst in solid form or as a solution or slurry. Single site catalyst, cocatalyst, and support can be mixed together in the presence or absence of a diluent or solvent, but use of diluent(s) or solvent(s) is preferred in some embodiments.

The Polymerization Process

Olefin polymerization processes that are compatible with the current disclosure include gas phase, slurry phase and combined gas phase/slurry phase polymerization processes and solution phase polymerization processes, with gas phase processes being preferred in some embodiments. For example ethylene copolymerization with an alpha-olefin is carried out in the gas phase, in for example at least one fluidized bed reactor.

Detailed descriptions of slurry polymerization processes are widely reported in the patent literature. For example, particle form polymerization, or a slurry process where the temperature is kept below the temperature at which the polymer goes into solution is described in U.S. Pat. No. 3,248,179. Slurry processes include those employing a loop reactor and those utilizing a single stirred reactor or a plurality of stirred reactors in series, parallel, or combinations thereof. Non-limiting examples of slurry processes include continuous loop or stirred tank processes. Further examples of slurry processes are described in U.S. Pat. No. 4,613,484.

Slurry processes are conducted in the presence of a hydrocarbon diluent such as an alkane (including isoalkanes), an aromatic or a cycloalkane. The diluent may also be the alpha olefin comonomer used in copolymerizations. Alkane diluents include propane, butanes, (i.e., normal butane and/or isobutane), pentanes, hexanes, heptanes and octanes. The monomers may be soluble in (or miscible with) the diluent, but the polymer is not (under polymerization conditions). The polymerization temperature is, for example, from about 5° C. to about 200° C., or for example, less than about 120° C., or for example, from about 10° C. to 100° C. The reaction temperature is selected so that an ethylene copolymer is produced in the form of solid particles. The reaction pressure is influenced by the choice of diluent and reaction temperature. For example, pressures may range from 15 to 45 atmospheres (about 220 to 660 psi or about 1500 to about 4600 kPa) when isobutane is used as diluent (see, for example, U.S. Pat. No. 4,325,849) to approximately twice that (i.e. from 30 to 90 atmospheres-about 440 to 1300 psi or about 3000-9100 kPa) when propane is used (see U.S. Pat. No. 5,684,097). The pressure in a slurry process must be kept sufficiently high to keep at least part of the ethylene monomer in the liquid phase. The reaction may take place in a jacketed closed loop reactor having an internal stirrer (e.g., an impeller) and at least one settling leg. Catalyst, monomers and diluents are fed to the reactor as liquids or suspensions. The slurry circulates through the reactor and the jacket is used to control the temperature of the reactor. Through a series of let down valves the slurry enters a settling leg and then is let down in pressure to flash the diluent and unreacted monomers and recover the polymer, for example, in a cyclone. The diluent and unreacted monomers are recovered and recycled back to the reactor.

A gas phase process is commonly carried out in a fluidized bed reactor. Such gas phase processes are widely described in the literature (see for example U.S. Pat. Nos. 4,482,687; 4,543,399; 4,588,790; 5,028,670; 5,317,036; 5,352,749; 5,405,922; 5,436,304; 5,433,471; 5,462,999; 5,616,661 and 5,668,228). In some embodiments a fluidized bed gas phase polymerization reactor employs a "bed" of polymer and catalyst which is fluidized by a flow of monomer and other optional components which are at least partially gaseous. Heat is generated by the enthalpy of polymerization of the monomer (and optional comonomer(s)) flowing through the bed. Un-reacted monomer and other optional gaseous components exit the fluidized bed and are contacted with a cooling system to remove this heat. The cooled gas stream, including monomer, and optional other components (such as condensable liquids), is then re-circulated through the polymerization zone, together with "make-up" monomer to replace that which was polymerized on the previous pass. Simultaneously, polymer product is withdrawn from the reactor. As will be appreciated by those skilled in the art, the "fluidized" nature of the polymerization bed helps to evenly distribute/mix the heat of reaction and thereby minimize the formation of localized temperature gradients.

The reactor pressure in a gas phase process may vary from about atmospheric to about 600 Psig. In another embodiment, the pressure can range from about 100 psig (690 kPa) to about 500 psig (3448 kPa). In yet another embodiment, the pressure can range from about 200 psig (1379 kPa) to about 400 psig (2759 kPa). In still another embodiment, the pressure can range from about 250 psig (1724 kPa) to about 350 psig (2414 kPa).

The reactor temperature in a gas phase process may vary according to the heat of polymerization as described above. In a specific embodiment, the reactor temperature can be from about 30° C. to about 130° C. In another specific embodiment, the reactor temperature can be from about 60° C. to about 120° C. In yet another specific embodiment, the reactor temperature can be from about 70° C. to about 110° C. In still yet another specific embodiment, the temperature of a gas phase process can be from about 70° C. to about 100° C.

The fluidized bed process described above is well adapted for the preparation of polyethylene and polyethylene copolymers. Hence, monomers and comonomers include ethylene and $C_{3-12}$ alpha olefins which are unsubstituted or substituted by up to two $C_{1-6}$ hydrocarbyl radicals; $C_{8-12}$ vinyl aromatic olefins which are unsubstituted or substituted by up to two substituents selected from $C_{1-4}$ hydrocarbyl radicals; and $C_{4-12}$ straight chained or cyclic diolefins which are unsubstituted or substituted by a $C_{1-4}$ hydrocarbyl radical. Illustrative non-limiting examples of alpha-olefins that may be copolymerized with ethylene include one or more of propylene, 1-butene, 1-pentene, 4-methyl-1-pentene, 1-hexene, 1-octene, and 1-decene, styrene, alpha methyl styrene, p-t-butyl styrene, and the constrained-ring cyclic olefins such as cyclobutene, cyclopentene, dicyclopentadiene norbornene, hydrocarbyl-substituted norbornenes, alkenyl-substituted norbornenes and the like (e.g., 5-methylene-2-norbornene and 5-ethylidene-2-norbornene, bicyclo-(2,2,1)-hepta-2,5-diene).

The process is particularly well suited to copolymerization reactions involving polymerization of ethylene in combination with one or more of the comonomers, for example, the alpha-olefins: propylene, 1-butene, 1-pentene, 4-methyl-1-pentene, 1-hexene, 1-octene, 1-decene, styrene and cyclic and polycyclic olefins such as cyclopentene, norbornene and cyclohexene or a combination thereof. Other comonomers for use with ethylene can include polar vinyl monomers, diolefins such as 1,3-butadiene, 1,4-pentadiene, 1,4-hexadiene, 1,5-hexadiene, norbornadiene, and other unsaturated monomers including acetylene and aldehyde monomers. Higher alpha-olefins and polyenes or macromers can be used also. In some embodiments the comonomer is an alpha-olefin having from 3 to 15 carbon atoms, or for example, 4 to 12 carbon atoms, or for example, 4 to 10 carbon atoms.

In an embodiment of the present disclosure, ethylene is copolymerized with at least 1-butene and ethylene makes up at least 75 wt % of the total olefin feed entering the reactor.

In an embodiment of the present disclosure, ethylene is copolymerized with at least 1-butene and ethylene makes up at least 85 wt % of the total olefin feed entering the reactor.

In an embodiment of the present disclosure, ethylene is copolymerized with 1-butene and ethylene makes up at least 75 weight % (i.e., wt %) of the total olefin feed entering the reactor.

In an embodiment of the present disclosure, ethylene is copolymerized with 1-butene and ethylene makes up at least 85 wt % of the total olefin feed entering the reactor.

Gas phase fluidized bed polymerization processes may employ a polymer seed bed in the reactor prior to initiating the polymerization process. It is contemplated by the current disclosure to use a polymer seed bed that has been treated with an antistatic agent or an optional scavenger. In addition, the polymer products obtained by using the catalysts and processes of the current disclosure may themselves be used as polymer seed bed materials.

Optionally, scavengers are added to the polymerization process. The present disclosure can be carried out in the presence of any suitable scavenger or scavengers. Scavengers are well known in the art.

In an embodiment of the disclosure, scavengers are organoaluminum compounds having the formula: $Al^3(X^3)_n(X^4)_{3-n}$, where $(X^3)$ is a hydrocarbyl having from 1 to about 20 carbon atoms; $(X^4)$ is selected from alkoxide or aryloxide, any one of which having from 1 to about 20 carbon atoms; halide; or hydride; and n is a number from 1 to 3, inclusive; or hydrocarbyl aluminoxanes having the formula:

wherein each $R^3$ is independently selected from $C_{1-20}$ hydrocarbyl radicals and m is from 3 to 50. Some non-limiting preferred scavengers useful in the current disclosure include triisobutylaluminum, triethylaluminum, trimethylaluminum or other trihydrocarbyl aluminum compounds.

The scavenger may be used in any suitable amount but by way of non-limiting examples only, can be present in an amount to provide a molar ratio of Al:M (where M is the metal of the phosphinimine catalyst) of from about 20 to about 2000, or from about 50 to about 1000, or from about 100 to about 500. In some embodiments the scavenger is added to the reactor prior to the polymerization catalyst and in the absence of additional poisons and over time declines to 0, or is added continuously.

Optionally, the scavengers may be independently supported. For example, an inorganic oxide that has been treated with an organoaluminum compound or hydrocarbyl aluminoxane may be added to the polymerization reactor. The method of addition of the organoaluminum or hydrocarbyl aluminoxane compounds to the support is not specifically defined and is carried out by procedures well known in the art.

The scavenger can be fed to the reactor using any suitable means and may be diluted or dissolved in a suitable liquid hydrocarbon diluent or solvent respectively.

The polymerization process may be carried out in the presence of any suitable anti-static agent or agents. The use of anti-static agents in a gas-phase or a slurry phase polymerization processes is well known in the art. Antistatic agents are also recognized in the art by the term "continuity additive" or "catalyst modifier." Generally speaking, a "catalyst modifier" is a substance or a mixture of substances which, when present in appropriate amounts, can reduce, prevent or mitigate at least one of fouling, sheeting, and static level of a material in polymerization reactor.

Some non-limiting examples of catalyst modifiers are alkoxylated amines (also known as alkanolamines, see European Patent No. 811,638 and U.S. Pat. Nos. 6,140,432; 6,124,230; 6,114,479 for examples), carboxylate metal salts (see U.S. Pat. Nos. 7,354,880; 6,300,436; 6,306,984; 6,391, 819; 6,472,342 and 6,608,153 for examples), polysulfones, polymeric polyamines and sulfonic acids (see U.S. Pat. Nos. 6,562,924; 6,022,935 and 5,283,278 for examples). Other possible catalyst modifiers are described in European Patent Application No. 107,127, including polyoxyethylenealkylamines.

Specific examples of alkoxylated amines which may be used in the present disclosure are Kemamine AS-990™, ARMOSTAT 1800™, and ATMER-163™ which are available from Ciba, Akzo-Nobel or Witco Chemical Company. Other suitable catalyst modifiers include aluminum stearate and aluminum oleate. Still other specific catalyst modifiers are supplied commercially under the trademarks OCT-ASTAT™ and STADIS™. The catalyst modifier STADIS is described in U.S. Pat. Nos. 7,476,715; 6,562,924 and 5,026,795 and is available from Octel Starreon. STADIS comprises a polysulfone copolymer, a polymeric amine and an oil soluble sulfonic acid. Another suitable catalyst modifier which is similar to STADIS is commercially available under the trademark STATSAFE™.

In an embodiment of the disclosure, a catalyst modifier is added directly to the supported catalyst. The amount of catalyst modifier added to a catalyst will depend on a number of factors such as but not limited to the type of catalyst modifier and the type of polymerization catalyst (and the type of support). Accordingly the amount of catalyst modifier used is not specifically defined, but can be from 0 (e.g., optionally) up to 150,000 parts per million (ppm) based on the weight of the supported catalyst. Alternatively, the amount of catalyst modifier added to a catalyst can be from about 0.2 to 10 weight percent based on the total weight of the catalyst system. By way of non-limiting example only, from 10,000 to 30,000 ppm of a STADIS catalyst modifier is used when it is combined with a supported polymerization catalyst.

In another embodiment, the catalyst modifier may be added directly to the reactor and separately from the polymerization catalyst. The total amount of catalyst modifier or additives to be present in the reactor will, for example, not exceed 250 or 200, or 150, or 125, or 100, or 90, or 80, or 70 or 60, or 50, or 40, or 30, or 20 or 10 ppm (parts per million by weight of polymer being produced) and/or the amount of catalyst modifier will be zero, or greater than 1, or 3, or 5, or 7, or 10, or 12, or 14, or 15, or 17, or 20 ppm based on the weight of polymer being produced (usually expressed as pounds or kilograms per unit of time). Any of these lower limits are combinable with any upper limit. These amounts catalyst modifier contemplate one, two, three, four or more catalyst modifier. The total amount of one or two or more catalyst modifiers in the reactor will be understood to be additive and where the total amount can be described as disclosed immediately above. The catalyst modifier can be added directly to the reactor through a dedicated feed line, and/or added to any convenient feed stream, including the ethylene feed stream, the comonomer feed stream, the catalyst feed line, or the recycle line. If more than one catalyst modifier is used, each one may be added to the reactor as separate feed streams, or as any combination of separate feed streams or mixtures. The manner in which the catalyst modifier are added to the reactor is not important, so long as the additive(s) are well dispersed within the fluidized bed, and that their feed rates (or concentrations) are regulated in a manner to provide minimum levels of fouling and/or static. From the productivity of the catalyst it is fairly routine to determine the feed rate of the antistatic agent to the reactor based on the catalyst feed rate.

In another embodiment of the disclosure, the catalyst modifier (e.g. antistatic agent) may be added directly to the reactor and separately from the polymerization catalyst as well as added directly to the supported catalyst.

In an embodiment of the disclosure, an ethylene/1-butene copolymer is made in a gas phase reactor in the presence of a polymerization catalyst system comprising a single site catalyst; a catalyst activator; and a support.

In an embodiment of the disclosure, an ethylene/1-butene copolymer is made in a gas phase reactor in the presence of a polymerization catalyst system comprising a single site catalyst; a catalyst activator; a support and a catalyst modifier.

In an embodiment of the disclosure, an ethylene/1-butene copolymer is made in a single gas phase reactor in the presence of a polymerization catalyst system comprising a single site catalyst; a catalyst activator; and a support.

In an embodiment of the disclosure, an ethylene/1-butene copolymer is made in a gas phase reactor in the presence of a polymerization catalyst system comprising a phosphinimine catalyst; a catalyst activator; and a support.

In an embodiment of the disclosure, an ethylene/1-butene copolymer is made in a gas phase reactor in the presence of a polymerization catalyst system comprising a phosphinimine catalyst; a catalyst activator; a support and a catalyst modifier.

In an embodiment of the disclosure, an ethylene/1-butene copolymer is made in a single gas phase reactor in the presence of a polymerization catalyst system comprising a phosphinimine catalyst; a catalyst activator; and a support.

In an embodiment of the disclosure, an ethylene/1-butene copolymer is made in a single gas phase reactor in the presence of a polymerization catalyst system comprising a phosphinimine catalyst; a catalyst activator; and a support and the phosphinimine catalyst has the formula:

(1-R*-Indenyl)Ti(N=P(t-Bu)$_3$)X$_2$;

wherein R* is a substituted or unsubstituted alkyl group, a substituted or an unsubstituted aryl group, or a substituted or unsubstituted benzyl group, wherein substituents for the alkyl, aryl or benzyl group are selected from alkyl, aryl, alkoxy, aryloxy, alkylaryl, arylalkyl and halide substituents; and wherein X is an activatable ligand.

In an embodiment of the disclosure, an ethylene/1-butene copolymer is made in a single gas phase reactor in the presence of a polymerization catalyst system comprising a phosphinimine catalyst; a catalyst activator; a support and a catalyst modifier and the phosphinimine catalyst has the formula:

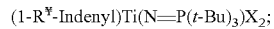

(1-R*-Indenyl)Ti(N=P(t-Bu)$_3$)X$_2$;

wherein R* is a substituted or unsubstituted alkyl group, a substituted or an unsubstituted aryl group, or a substituted or unsubstituted benzyl group, wherein substituents for the alkyl, aryl or benzyl group are selected from alkyl, aryl, alkoxy, aryloxy, alkylaryl, arylalkyl and halide substituents; and wherein X is an activatable ligand.

In an embodiment of the disclosure, an ethylene/1-butene copolymer is made in a single gas phase reactor in the presence of a polymerization catalyst system comprising a phosphinimine catalyst; a catalyst activator; and a support and the phosphinimine catalyst has the formula: (1-C$_6$F$_5$CH$_2$-Ind)Ti(N=P(t-Bu)$_3$)X$_2$ where X is an activatable ligand.

The Ethylene/1-Butene Copolymer Composition

In the present disclosure, the terms "ethylene/butene copolymer", "ethylene copolymer", "ethylene/1-butene copolymer", "ethylene/butene polymer", "ethylene/l-butene polymer", "butene copolymer", are used interchangeably and all connote a polymer consisting of polymerized ethylene and 1-butene units.

In some embodiments of the present disclosure, the ethylene copolymer compositions are preferably not polymer blends, but optionally they may be used as a component in a polymer blend. The term polymer "blend" is herein meant to connote a dry blend of two dissimilar or different polymers, in-reactor blends arising from the use of multi or mixed catalyst systems in a single reactor zone, and blends that result from the use of one catalyst in at least two reactors operating under different polymerization conditions, or blends involving the use of at least two distinct catalysts in one or more reactors under the same or different conditions (e.g., a blend resulting from in series reactors each running under different conditions or with different catalysts).

In embodiments of the disclosure, the ethylene/butene copolymer composition will comprise at least 75 weight % of ethylene units, or at least 80 wt % of ethylene units, or at least 85 wt % of ethylene units with the balance being 1-butene units, based on the weight of the ethylene copolymer composition.

In embodiments of the disclosure, the ethylene/butene copolymer will have a melt index (I$_2$) of from 0.025 to 10 g/10 min, including all the numbers and narrower ranges available within this range such as for example, from 0.05 to 10.0 g/l 0 min, or from 0.075 to 10.0 g/10 min, or from 1.0 to 10.0 g/10 min, or from 0.05 to 7.5 g/10 min, or from 0.075 to 7.5 g/10 min, or from 1.0 to 7.5 g/l 0 min, or from 0.05 to 5.0 g/10 min, or from 0.075 to 5.0 g/10 min, or from 1.0 to 5.0 g/10 min, or from 0.05 to 3.00 g/10 min, or from 0.075 to 3.0 g/10 min, or from 1.0 to 3.0 g/10 min, or from 0.25 to 3.0 g/10 min, or from 0.25 to 5.0 or from 0.5 to 3.0 g/10 min. In embodiments of the disclosure, the ethylene/butene copolymer will have a melt index (I$_2$) of from greater than 0.25 g/10 min to 5.0 g/10 min, or from greater than 0.25 g/10 min to 3.0 g/10 min.

In embodiments of the disclosure, the ethylene/butene copolymer will have a density of from 0.910 g/cc to 0.940 g/cc including all the numbers and narrower ranges within this range, such as for example, from 0.912 g/cc to 0.940 g/cc, or from 0.912 g/cc to 0.935 g/cc, or from 0.912 g/cc to 0.930 g/cc, or from 0.912 g/cc to 0.927 g/cc, or from 0.912 g/cc to 0.925 g/cc, or from 0.914 g/cc to 0.940 g/cc, or from 0.914 g/cc to 0.935 g/cc, or from 0.914 g/cc to 0.930 g/cc, or from 0.914 g/cc to 0.927 g/cc, or from 0.914 g/cc to 0.925 g/cc, or from 0.916 g/cc to 0.940 g/cc, or from 0.916 g/cc to 0.935 g/cc, or from 0.916 g/cc to 0.930 g/cc, or from 0.916 to 0.927 g/cc, or from 0.916 to 0.925 g/cc, or from 0.918 g/cc to 0.940 g/cc, or from 0.918 g/cc to 0.935 g/cc, or from 0.918 g/cc to 0.930 g/cc, or from 0.918 to 0.927 g/cc, or from 0.918 to 0.925 g/cc, (note: "g" stands for gram; "cc" stands for cubic centimeter, cm$^3$).

The ethylene/butene copolymer of the present disclosure may have a unimodal, broad unimodal, bimodal, or multimodal profile in a gel permeation chromatography (GPC) curve generated according to the method of ASTM D6474-99. The term "unimodal" is herein defined to mean there will be only one significant peak or maximum evident in the GPC-curve. A unimodal profile includes a broad unimodal profile. By the term "bimodal" it is meant that in addition to a first peak, there will be a secondary peak or shoulder which represents a higher or lower molecular weight component (i.e., the molecular weight distribution, can be said to have two maxima in a molecular weight distribution curve). Alternatively, the term "bimodal" connotes the presence of two maxima in a molecular weight distribution curve generated according to the method of ASTM D6474-99. The term "multimodal" denotes the presence of two or more maxima in a molecular weight distribution curve generated according to the method of ASTM D6474-99.

In an embodiment of the disclosure, the ethylene/butene copolymer will have a unimodal profile in a gel permeation chromatography (GPC) curve generated according to the method of ASTM D6474-99. The term "unimodal" is herein defined to mean there will be only one significant peak or maximum evident in the GPC-curve. A unimodal profile includes a broad unimodal distribution curve or profile.

In embodiments of the disclosure, the ethylene/butene copolymer will exhibit a weight average molecular weight (M$_w$) as determined by gel permeation chromatography (GPC) of from 30,000 to 250,000, including all the numbers and narrower ranges within this range, such as for example, from 50,000 to 200,000, or from 50,000 to 175,000, or from 75,000 to 150,000, or from 80,000 to 130,000.

In embodiments of the disclosure, the ethylene/butene copolymer will exhibit a number average molecular weight (M$_n$) as determined by gel permeation chromatography (GPC) of from 5,000 to 100,000 including all the numbers and narrower ranges within this range, such as for example from 7,500 to 100,000, or from 7,500 to 75,000, or from 7,500 to 50,000, or from 10,000 to 100,000, or from 10,000 to 75,000, or from 10,000 to 50,000.

In embodiments of the disclosure, the ethylene/butene copolymer will exhibit a Z-average molecular weight (M$_Z$) as determined by gel permeation chromatography (GPC) of from 50,000 to 1,000,000 including all the numbers and narrower ranges within this range, such as for example from 75,000 to 750,000, or from 100,000 to 500,000, or from 100,000 to 400,000, or from 125,000 to 375,000, or from 150,000 to 350,000, or from 175,000 to 375,000, or from 175,000 to 400,000, or from 200,000 to 400,000 or from 225,000 to 375,000.

In embodiments of the disclosure, the ethylene/butene copolymer will have a molecular weight distribution (M$_w$/M$_n$) as determined by gel permeation chromatography (GPC) of from 2.5 to 6.0, including all the numbers and narrower ranges within this range, such as for example, from 3.0 to 6.0, or from 3.3 to 6.0, or from 3.5 to 6.0, or from 3.75 to 6.0, or from 2.5 to 5.5, or from 2.75 to 5.0, or from 2.5 to 5.0, or from 2.75 to 3.0, or from 3.0 to 5.0, or from 3.0 to 4.5, or from 3.0 to 4.0, or from 3.0 to 3.5, or from 2.5 to 3.5 or from 2.75 to 3.5, or from 2.75 to 4.0.

In embodiments of the disclosure, the ethylene/butene copolymer will have a Z average molecular weight distribution (M$_z$/M$_w$) as determined by gel permeation chromatography (GPC) of from 2.0 to 5.5, including all the numbers and narrower ranges within this range, such as for example, from 2.0 to 5.0, or from 2.0 to 4.5, or from 2.0 to 4.0, or from 2.0 to 3.0, or from 2.0 to 2.75, or from 2.0 to 2.5.

In an embodiment of the disclosure, the ethylene/butene copolymer will have a flat comonomer incorporation profile as measured using Gel-Permeation Chromatography with Fourier Transform Infra-Red detection (GPC-FTIR). In an embodiment of the disclosure, the ethylene/butene copolymer will have a negative (i.e., "normal") comonomer incorporation profile as measured using GPC-FTIR. In an embodiment of the disclosure, the ethylene/butene copolymer will have an inverse (i.e., "reverse" or "reversed") or partially inverse comonomer incorporation profile as measured using GPC-FTIR.

If the comonomer incorporation decreases with molecular weight as measured using GPC-FTIR, the comonomer incorporation or distribution is described as "normal" or "negative." If the comonomer incorporation is approximately constant with molecular weight as measured using GPC-FTIR, the comonomer incorporation or distribution is described as "flat" or "uniform." The terms "reverse(d) comonomer incorporation/distribution" and "partially reverse(d) comonomer incorporation/distribution" mean that in the GPC-FTIR data obtained for the copolymer, there is one or more higher molecular weight components having a higher comonomer incorporation than in one or more lower molecular weight segments. The term "reverse(d) comonomer incorporation/distribution" is used herein to mean, that across the molecular weight range of the ethylene copolymer, comonomer contents for the various polymer fractions are not substantially uniform and the higher molecular weight fractions thereof have proportionally higher comonomer contents (i.e. if the comonomer incorporation rises with molecular weight, the incorporation/distribution is described as "reverse" or "reversed"). Where the comonomer incorporation rises with increasing molecular weight and then declines, the comonomer incorporation/distribution is still considered "reverse", but may also be described as "partially reverse."

In an embodiment of the disclosure, the ethylene/butene copolymer has a reversed comonomer incorporation profile as measured using GPC-FTIR.

In an embodiment of the disclosure, the ethylene/1-butene copolymer will have a comonomer incorporation profile as determined by GPC-FTIR which satisfies the following condition: SCB/1000C at MW of 200,000–SCB/1000C at MW of 50,000 is a greater than 0; where "–" is a minus sign, SCB/1000C is the comonomer content determined as the number of short chain branches per thousand carbons and MW is the corresponding molecular weight (i.e., the absolute molecular weight) on a GPC or GPC-FTIR chromatograph.

In an embodiment of the disclosure, the ethylene/1-butene copolymer will have a comonomer incorporation profile as determined by GPC-FTIR which satisfies the following condition: SCB/1000C at MW of 200,000–SCB/1000C at MW of 50,000 is greater than 1.0; where SCB/1000C is the comonomer content determined as the number of short chain branches per thousand carbons and MW is the corresponding molecular weight (i.e., the absolute molecular weight) on a GPC or GPC-FTIR chromatograph.

In an embodiment of the disclosure, the ethylene/1-butene copolymer will have a comonomer incorporation profile as determined by GPC-FTIR which satisfies the following condition: SCB/1000C at MW of 200,000–SCB/1000C at MW of 50,000 is greater than 2.0; where SCB/1000C is the comonomer content determined as the number of short chain branches per thousand carbons and MW is the corresponding molecular weight (i.e., the absolute molecular weight) on a GPC or GPC-FTIR chromatograph.

In an embodiment of the disclosure, the ethylene/1-butene copolymer will have a comonomer incorporation profile as determined by GPC-FTIR which satisfies the following condition: SCB/1000C at MW of 200,000–SCB/1000C at MW of 50,000>3.0; where SCB/1000C is the comonomer content determined as the number of short chain branches per thousand carbons and MW is the corresponding molecular weight (i.e., the absolute molecular weight) on a GPC or GPC-FTIR chromatograph.

In an embodiment of the disclosure, the ethylene/1-butene copolymer will have a comonomer incorporation profile as determined by GPC-FTIR which satisfies the following condition: SCB/1000C at MW of 200,000–SCB/1000C at MW of 50,000>4.0; where SCB/1000C is the comonomer content determined as the number of short chain branches per thousand carbons and MW is the corresponding molecular weight (i.e., the absolute molecular weight) on a GPC or GPC-FTIR chromatograph.

In an embodiment of the disclosure, the ethylene/1-butene copolymer will have a comonomer incorporation profile as determined by GPC-FTIR which satisfies the following condition: SCB/1000C at MW of 200,000–SCB/1000C at MW of 50,000>5.0; where SCB/1000C is the comonomer content determined as the number of short chain branches per thousand carbons and MW is the corresponding molecular weight (i.e., the absolute molecular weight) on a GPC or GPC-FTIR chromatograph.

In an embodiment of the disclosure, the ethylene/1-butene copolymer will have a comonomer incorporation profile as determined by GPC-FTIR which satisfies the following condition: SCB/1000C at MW of 200,000–SCB/1000C at MW of 50,000>6.0; where SCB/1000C is the comonomer content determined as the number of short chain branches per thousand carbons and MW is the corresponding molecular weight (i.e., the absolute molecular weight) on a GPC or GPC-FTIR chromatograph.

In an embodiment of the disclosure, the ethylene/1-butene copolymer will have a comonomer incorporation profile as determined by GPC-FTIR which satisfies the following condition: SCB/1000C at MW of 200,000–SCB/1000C at MW of 50,000 of from 2.0 to 8.0 including narrower ranges within this range; where SCB/1000C is the comonomer content determined as the number of short chain branches per thousand carbons and MW is the corresponding molecular weight (i.e., the absolute molecular weight) on a GPC or GPC-FTIR chromatograph.

In an embodiment of the disclosure, the ethylene/1-butene copolymer will have a comonomer incorporation profile as determined by GPC-FTIR which satisfies the following condition: SCB/1000C at MW of 200,000–SCB/1000C at MW of 50,000 of from 3.0 to 7.0 including narrower ranges within this range; where SCB/1000C is the comonomer content determined as the number of short chain branches per thousand carbons and MW is the corresponding molecular weight (i.e., the absolute molecular weight) on a GPC or GPC-FTIR chromatograph.

In embodiments of the disclosure, the ethylene/butene copolymer will have a melt flow ratio (the MFR=$I_{21}/I_2$) of from 18 to 35, including all the numbers and narrower ranges within this range such as for example from 20 to 35, or from 22 to 34, or from 22 to 32, or from 22 to 30, or from 22 to 28, or from 20 to 34, or from 20 to 32, or from 20 to 30 or from 20 to 28. In further embodiments of the disclosure, the ethylene/1-butene copolymer will have an $I_{21}/I_2$ of greater than 20 but less than 35, or greater than 22 but less than 32.

In embodiments of the disclosure, the ethylene/butene copolymer has a melt index ratio (I10/I2) of from greater than 5 to less than 14, including all the numbers and narrower ranges within this range such as for example from 6 to 12, or from 6.5 to 12, or from 7 to 12, or from 5 to 10, or from 5.5 to 10, or from 6 to 10, or from 6.5 to 10, or from 7 to 10.

In embodiments of the disclosure, the ethylene/butene copolymer will have a composition distribution breadth index $CDBI_{50}$, as determined by temperature elution fractionation (TREF) of from 45% to 85% by weight, including all the numbers and narrower ranges within this range such as for example, from 45% to 80% by weight, or from 50% to 85% by weight, or from 50% to 75% by weight, or from 55% to 80% by weight, or from 55% to 75% by weight, or from 60% to 80% by weight, or from 60% to 80% by weight.

In the present disclosure, the ethylene/butene copolymer may be characterized by the T(75)-T(25) value, where the T(25) is the temperature at which 25 wt % of the eluted copolymer is obtained, and T(75) is the temperature at which 75 wt % of the eluted copolymer is obtained in a TREF experiment.

In an embodiment of the present disclosure, the ethylene/butene copolymer will have a T(75)-T(25) of from 5 to 25° C. as determined by TREF. In an embodiment of the present disclosure, the ethylene/butene copolymer will have a T(75)-T(25) of from 7 to 25° C. as determined by TREF. In an embodiment of the present disclosure, the ethylene/butene copolymer will have a T(75)-T(25) of from 10 to 25° C. as determined by TREF. In an embodiment of the present disclosure, the ethylene/butene copolymer will have a T(75)-T(25) of from 7 to 22.5° C. as determined by TREF. In an embodiment of the present disclosure, the ethylene/butene copolymer will have a T(75)-T(25) of from 7.0 to 20° C. as determined by TREF. In an embodiment of the present disclosure, the ethylene/butene copolymer will have a T(75)-T(25) of from 5 to 17.5° C. as determined by TREF. In an embodiment of the present disclosure, the ethylene/butene copolymer will have a T(75)-T(25) of from 7 to 17.5° C. as determined by TREF.

In embodiments of the disclosure, the ethylene/butene copolymer will have a CY a-parameter (also called the Carreau-Yasuda shear exponent) of from 0.01 to 0.45, or from 0.01 to 0.40, or from 0.05 to 0.40, or from 0.05 to 0.30, or from 0.01 to 0.30, or from 0.01 to 0.25, or from 0.05 to 0.30, or from 0.05 to 0.25.

In embodiments of the disclosure, the ethylene/butene copolymer will have a normalized shear thinning index, SHI @0.1 rad/s (i.e., the $\eta^*_{0.1}/\eta_0$) of from 0.001 to 0.75, or from 0.001 to 0.70, or from 0.001 to 0.65, or from 0.001 to 0.60, or from 0.001 to 0.55, or from 0.001 to 0.50, or from 0.001 to 0.45, or from 0.001 to 0.40, or less than 0.75, or less than 0.70, or less than 0.65, or less than 0.60, or less than 0.55, or less than 0.50, or less than 0.45, or less than 0.40.

In embodiments of the disclosure, the ethylene/butene copolymer will have an accelerated haul-off melt strength ($\sigma^{MS}$) as determined by Rosand capillary rheometry at 190° C. of greater than 2.75, or greater than 3.0, or greater than 3.25, or greater than 3.5, or greater than 3.75, or greater than 4.0, or greater than 4.25, or greater than 4.5 centiNewtons (cN).

In embodiments of the disclosure, the ethylene/butene copolymer will have an accelerated haul-off melt strength ($\sigma^{MS}$) as determined by Rosand capillary rheometry at 190° C. of from 2.75 to 6.0 including all the numbers and narrower ranges within this range such as for example, from 2.75 to 5.75 cN, or from 3.0 to 5.75 cN, or from 3.0 to 5.5 cN, or from 3.0 to 5.0 cN, or from 3.0 to 4.75 cN.

In an embodiment of the disclosure, the ethylene/butene copolymer will have a TREF profile, as measured by temperature rising elution fractionation, which is multimodal, comprising at least two elution intensity maxima or peaks.

In an embodiment of the disclosure, the ethylene/butene copolymer will have an amount of copolymer eluting at a temperature of from 90° C. to 105° C., of from 1 to 20 wt % as determined by temperature rising elution fractionation (TREF). In an embodiment of the disclosure, from 1 to 15 wt % of the ethylene/butene copolymer will be represented within a temperature range of from 90° C. to 105° C. in a TREF profile. In an embodiment of the disclosure, from 1.0 to 10 wt % of the ethylene/butene copolymer will be represented within a temperature range of from 90° C. to 105° C. in a TREF profile. In an embodiment of the disclosure, from 1.0 to 7.5 wt % of the ethylene/butene copolymer will be represented within a temperature range of from 90° C. to 105° C. in a TREF profile.

In embodiments of the disclosure, less than 1 wt %, or less than 0.5 wt %, or less than 0.05 wt %, or 0 wt % of the ethylene/butene copolymer will elute at a temperature of above 100° C. in a TREF analysis.

In an embodiment of the disclosure, the ethylene/butene copolymer will have a TREF profile, as measured by temperature rising elution fractionation, comprising: i) a multimodal TREF profile comprising at least two elution intensity maxima (or peaks); ii) less than 5 wt % of the copolymer represented at a temperature at or below 40° C.; and iii) from 1 to 10 wt % of the copolymer represented at a temperature of from 90° C. to 105° C.

In an embodiment of the disclosure, the ethylene/butene copolymer has a multimodal TREF profile comprising at least two elution intensity maxima (or peaks).

In an embodiment of the disclosure, the ethylene/butene copolymer has a multimodal TREF profile defined by at least two intensity maxima (or peaks) occurring at elution temperatures T(low), and T(high), where T(low) is from 60° C. to 80° C., and T(high) is from 88° C. to 100° C.

In an embodiment of the disclosure, the ethylene/butene copolymer has a multimodal TREF profile defined by at least two intensity maxima (or peaks) occurring at elution temperatures T(low), and T(high), where T(low) is from 65° C. to 80° C., and T(high) is from 90° C. to 100° C.

In an embodiment of the disclosure, the ethylene/butene copolymer has a multimodal TREF profile comprising at least three elution intensity maxima (or peaks).

In an embodiment of the disclosure, the ethylene/butene copolymer has a trimodal TREF profile comprising three elution intensity maxima (or peaks).

In an embodiment of the disclosure, the ethylene/butene copolymer has a multimodal TREF profile defined by three elution intensity maxima (or peaks) occurring at elution temperatures T(low), T(medium or "med" for short) and T(high), where the intensity of the peaks at T(low) and T(med) is greater than the intensity of the peak at T(high).

In an embodiment of the disclosure, the ethylene/butene copolymer has a multimodal TREF profile defined by three elution intensity maxima (or peaks) occurring at elution temperatures T(low), T(medium or "med" for short) and T(high), where T(low) is from 60° C. to 80° C., T(high) is from 90° C. to 100° C., and T(med) is higher than T(low), but lower than T(high).

In an embodiment of the disclosure, the ethylene/butene copolymer has two melting peaks as measured by differential scanning calorimetry (DSC).

In embodiments of the disclosure, the ethylene/butene copolymer will have a hexane extractables level of ≤3.0 wt %, or ≤2.0 wt %, or ≤1.5 wt % or ≤1.0 wt %. In an embodiment of the disclosure, the ethylene/butene copolymer has a hexane extractables level of from 0.2 to 3.0 wt %, or from 0.2 to 2.5 wt %, or from 0.2 to 2.0 wt %, or from 0.2 to 1.0 wt %.

In an embodiment of the disclosure, the ethylene/butene copolymer satisfies the relationship: $(CDBI_{50}/\delta_{XO})^{3.0} \leq 6.5 - 5.7 \log [a(1.5(I_{21}/I_2)+(M_w/M_n))]$, where "$\delta^{XO}$" is the crossover phase angle in degrees at a frequency of 1 rad/second as determined by dynamic mechanical analysis (DMA), "a" is the CY a parameter determined by DMA and "$CDBI_{50}$" is the comonomer distribution breadth index as determined by TREF analysis.

In an embodiment of the disclosure, the ethylene/butene copolymer satisfies the relationship: $\sigma^{MS} \geq 5.0 \times 10^{-4} \times G^*_{XO}$, where "$\sigma^{MS}$" is the accelerated haul-off melt strength in centiNewtons (cN) as determined by Rosand capillary rheometry at 190° C., and "$G^*_{XO}$" is the crossover complex modulus in pascals (Pa) at a frequency of 1.0 rad/second as determined by dynamic mechanical analysis (DMA).

In an embodiment of the disclosure, the ethylene/butene copolymer satisfies both of the following relationships: $(CDBI_{50}/\delta_{XO})^{3.0} \leq 6.5 - 5.7 \log [a(1.5(I_{21}/I_2)+(M_w/M_n))]$ and $\sigma^{MS} \geq 5.0 \times 10^{-4} \times G^*_{XO}$.

Film Production

The extrusion-blown film process is a well-known process for the preparation of plastic film. The process employs an extruder which heats, melts and conveys the molten plastic and forces it through an annular die. In some embodiments, typical extrusion temperatures are from 330 to 500° F., especially 350 to 460° F.

The ethylene/1-butene copolymer film is drawn from the die and formed into a tube shape and eventually passed through a pair of draw or nip rollers. Internal compressed air is then introduced from a mandrel causing the tube to increase in diameter forming a "bubble" of the desired size. Thus, the blown film is stretched in two directions, namely in the axial direction (by the use of forced air which "blows out" the diameter of the bubble) and in the lengthwise direction of the bubble (by the action of a winding element which pulls the bubble through the machinery). External air is also introduced around the bubble circumference to cool the melt as it exits the die. Film width is varied by introducing more or less internal air into the bubble thus increasing or decreasing the bubble size. Film thickness is controlled primarily by increasing or decreasing the speed of the draw roll or nip roll to control the draw-down rate.

The bubble is then collapsed immediately after passing through the draw or nip rolls. The cooled film can then be processed further by cutting or sealing to produce a variety of consumer products. While not wishing to be bound by theory, it is generally believed by those skilled in the art of manufacturing blown films that the physical properties of the finished films are influenced by both the molecular structure of the ethylene copolymer and by the processing conditions. For example, the processing conditions are thought to influence the degree of molecular orientation (in both the machine direction and the axial or cross direction).

A balance of "machine direction" ("MD") and "transverse direction" ("TD"-which is perpendicular to MD) molecular orientation is generally considered desirable for the films associated with the disclosure (for example, Dart Impact strength, Machine Direction and Transverse Direction tear properties may be affected).

Thus, it is recognized that these stretching forces on the "bubble" can affect the physical properties of the finished film. In particular, it is known that the "blow up ratio" (i.e. the ratio of the diameter of the blown bubble to the diameter of the annular die) can have a significant effect upon the dart impact strength and tear strength of the finished film.

The above description relates to the preparation of monolayer films. Multilayer films may be prepared by 1) a "co-extrusion" process that allows more than one stream of molten polymer to be introduced to an annular die resulting in a multi-layered film membrane; or 2) a lamination process in which film layers are laminated together.

In an embodiment of the disclosure, the films of this disclosure are prepared using the above described blown film process.

An alternative process is the so-called cast film process, wherein the polyethylene is melted in an extruder, then forced through a linear slit die, thereby "casting" a thin flat film. The extrusion temperature for cast film may be somewhat hotter than that used in the blown film process (with example operating temperatures of from 450 to 550° F.). In some embodiments cast film is cooled (quenched) more rapidly than blown film.

In an embodiment of the disclosure, the films of this disclosure are prepared using a cast film process.

Additives

The ethylene/1-butene copolymer composition used in the current disclosure to make films, may also contain additives, such as for example, primary antioxidants (such as hindered phenols, including vitamin E); secondary antioxidants (especially phosphites and phosphonites); nucleating agents, plasticizers or polymer processing aids PPAs (e.g., fluoroelastomer and/or polyethylene glycol bound process aid), acid scavengers, stabilizers, anticorrosion agents, blowing agents, other ultraviolet light absorbers such as chain-breaking antioxidants, etc., quenchers, antistatic agents, slip agents, anti-blocking agent, pigments, dyes and fillers and cure agents such as peroxide.

These and other common additives in the polyolefin industry may be present in the ethylene/1-butene copolymer compositions from 0.01 to 50 wt % in one embodiment, and from 0.1 to 20 wt % in another embodiment, and from 1 to 5 wt % in yet another embodiment, wherein a desirable range may comprise any combination of any upper wt % limit with any lower wt % limit.

In an embodiment of the disclosure, antioxidants and stabilizers such as organic phosphites and phenolic antioxidants may be present in the ethylene/I-butene copolymer compositions from 0.001 to 5 wt % in one embodiment, and from 0.01 to 0.8 wt % in another embodiment, and from 0.02 to 0.5 wt % in yet another embodiment. Non-limiting examples of organic phosphites that are suitable are tris(2, 4-di-tert-butylphenyl)phosphite (IRGAFOS 168) and tris (nonyl phenyl) phosphite (WESTON 399). Non-limiting examples of phenolic antioxidants include octadecyl 3,5 di-t-butyl-4-hydroxyhydrocinnamate (IRGANOX 1076) and pentaerythrityl tetrakis(3,5-di-tert-butyl-4-hydroxyphenyl) propionate (IRGANOX 1010); and 1,3,5-Tri(3,5-di-tert-butyl-4-hydroxybenzyl-isocyanurate (IRGANOX 3114).

Fillers may be present in the ethylene/1-butene copolymer composition from 0.1 to 50 wt % in one embodiment, and from 0.1 to 25 wt % of the composition in another embodiment, and from 0.2 to 10 wt % in yet another embodiment. Fillers include but are not limited to titanium dioxide, silicon carbide, silica (and other oxides of silica, precipitated or not), antimony oxide, lead carbonate, zinc white, lithopone, zircon, corundum, spinel, apatite, Barytes powder, barium sulfate, magnesiter, carbon black, dolomite, calcium carbonate, talc and hydrotalcite compounds of the ions Mg, Ca, or Zn with Al, Cr or Fe and $CO_3$ and/or $HPO_4$, hydrated or not; quartz powder, hydrochloric magnesium carbonate, glass fibers, clays, alumina, and other metal oxides and carbonates, metal hydroxides, chrome, phosphorous and brominated flame retardants, antimony trioxide, silica, silicone, and blends thereof. These fillers may include any other fillers and porous fillers and supports which are known in the art.

Fatty acid salts may also be present in the ethylene/1-butene copolymer compositions. Such salts may be present from 0.001 to 2 wt % of the ethylene/-butene copolymer composition in one embodiment, and from 0.01 to 1 wt % in another embodiment. Examples of fatty acid metal salts include lauric acid, stearic acid, succinic acid, stearyl lactic acid, lactic acid, phthalic acid, benzoic acid, hydroxystearic acid, ricinoleic acid, naphthenic acid, oleic acid, palmitic acid, and erucic acid, suitable metals including Li, Na, Mg, Ca, Sr, Ba, Zn, Cd, Al, Sn, Pb and so forth. Desirable fatty acid salts are selected from magnesium stearate, calcium stearate, sodium stearate, zinc stearate, calcium oleate, zinc oleate, and magnesium oleate.

With respect to the physical process of producing the blend of the ethylene/1-butene copolymer and one or more additives, sufficient mixing should take place to assure that a uniform blend will be produced prior to conversion into a finished product. The ethylene/1-butene copolymer can be in any physical form when used to blend with the one or more additives. In one embodiment, reactor granules, defined as the granules of polymer that are isolated from the polymerization reactor, are used to blend with the additives. The reactor granules have an average diameter of from 10 μm to 5 mm, and from 50 μm to 10 mm in another embodiment. Alternately, the ethylene/1-butene copolymer is in the form of pellets, such as, for example, having an average diameter of from 1 mm to 6 mm that are formed from melt extrusion of the reactor granules.

One method of blending the additives with the ethylene/1-butene copolymer is to contact the components in a tumbler or other physical blending means, the copolymer being in the form of reactor granules. This can then be followed, if desired, by melt blending in an extruder. Another method of blending the components is to melt blend the ethylene/1-butene copolymer pellets with the additives directly in an extruder, or any other melt blending means.

Film Properties.

The film, or film layer of the present disclosure is made from the ethylene/1-butene copolymers defined as above. In some embodiments an additive as described above is mixed with the ethylene/1-butene copolymer prior to film production.

In embodiments of the disclosure, the film will have a dart impact of ≥80 g/mil, or ≥100 g/mil, or ≥110 g/mil, or ≥120 g/mil, or ≥130 g/mil, or ≥140 g/mil, or from 80 to 140 g/mil or from 80 to 130 g/mil or from 80 to 120 g/mil.

In embodiments of the disclosure, the film will have a ratio of MD tear to TD tear (MD tear/TD tear) of less than 0.50, or ≤0.40, or ≤0.30, or ≤0.25, or ≤0.20, or ≤0.15. In another embodiment of the disclosure, the film will have a ratio of MD tear to TD tear of from 0.010 to 0.50. In yet another embodiment of the disclosure, the film will have a ratio of MD tear to TD tear of from 0.01 to 0.40. In still another embodiment of the disclosure, the film will have a ratio of MD tear to TD tear of from 0.01 to 0.30. In still yet further embodiments of the disclosure, the film will have a ratio of MD tear to TD tear of from 0.01 to 0.25 or from 0.01 to 0.20.

In embodiments of the disclosure, a 1 mil film will have a machine direction (MD) secant modulus at 1% strain of ≥140 MPa, or ≥150 MPa, or ≥160 MPa, or ≥175 MPa, or ≥180 MPa≥190 MPa, or ≥200 MPa, or ≥210 MPa. In an embodiment of the disclosure, a 1 mil film will have a machine direction (MD) secant modulus at 1% strain of from 130 MPa to 220 MPa. In an embodiment of the disclosure, a 1 mil film will have a machine direction (MD) secant modulus at 1% strain of from 140 MPa to 210 MPa. In an embodiment of the disclosure, a 1 mil film will have a machine direction (MD) secant modulus at 1% strain of from 150 MPa to 210 MPa. In an embodiment of the disclosure, a 1 mil film will have a machine direction (MD) secant modulus at 1% strain of from 160 MPa to 210 MPa.

In an embodiment of the disclosure, a 1 mil film will have a transverse direction (TD) secant modulus at 1% strain of ≥160 MPa, or ≥170 MPa, or ≥180 MPa, or ≥190 MPa, or ≥200 MPa, or ≥210 MPa, or ≥220 MPa. In an embodiment of the disclosure, a 1 mil film will have a transverse direction (TD) secant modulus at 1% strain of from 160 MPa to 230 MPa. In an embodiment of the disclosure, a 1 mil film will have a transverse direction (TD) secant modulus at 1% strain of from 160 MPa to 220 MPa. In an embodiment of the disclosure, a 1 mil film will have a transverse direction (TD) secant modulus at 1% strain of from 170 MPa to 230 MPa. In an embodiment of the disclosure, a 1 mil film will have a transverse direction (TD) secant modulus at 1% strain of from 170 MPa to 220 MPa. In another embodiment of the disclosure, a 1 mil film will have a transverse direction (TD) secant modulus at 1% strain of from 180 MPa to 230 MPa. In another embodiment of the disclosure, a 1 mil film will have a transverse direction (TD) secant modulus at 1% strain of from 180 MPa to 220 Mpa.

The film or film layer may, by way of non-limiting example only, have a total thickness ranging from 0.5 mils to 4 mils (note: 1 mil=0.0254 mm), which will depend on for example the die gap employed during film casting or film blowing.

The above description applies to monolayer films. However, the film of the current disclosure may be used in a multilayer film. Multilayer films can be made using a co-extrusion process or a lamination process. In co-extrusion, a plurality of molten polymer streams are fed to an annular die (or flat cast) resulting in a multi-layered film on cooling. In lamination, a plurality of films are bonded together using, for example, adhesives, joining with heat and pressure and the like. A multilayer film structure may, for example, contain tie layers and/or sealant layers.

The film of the current disclosure may be a skin layer or a core layer and can be used in at least one or a plurality of layers in a multilayer film. The term "core" or the phrase "core layer", refers to any internal film layer in a multilayer film. The phrase "skin layer" refers to an outermost layer of a multilayer film (for example, as used in the production of produce packaging). The phrase "sealant layer" refers to a film that is involved in the sealing of the film to itself or to another layer in a multilayer film. A "tie layer" refers to any internal layer that adheres two layers to one another.

By way of non-limiting example only, the thickness of the multilayer films can be from about 0.5 mil to about 10 mil total thickness.

The films can be used for heavy duty bags, shrink film, agricultural film, garbage bags and shopping bags. The films can be produced by blow extrusion, cast extrusion, co-extrusion and be incorporated also in laminated structures.

EXAMPLES

All reactions involving air and or moisture sensitive compounds were conducted under nitrogen using standard Schlenk and cannula techniques, or in a glovebox. Reaction solvents were purified either using the system described by Pangborn et al. in *Organometallics* 1996, v15, p. 1518 or used directly after being stored over activated 4 Å molecular sieves. The methylaluminoxane used was a 10% MAO solution in toluene supplied by Albemarle which was used as received. The support used was silica Sylopol 2408 obtained from W.R. Grace. & Co. The support was calcined by fluidizing with air at 200° C. for 2 hours followed by nitrogen at 600° C. for 6 hours and stored under nitrogen.

Melt index, $I_2$, in g/10 min was determined on a Tinius Olsen Plastomer (Model MP993) in accordance with ASTM D1238 Procedure A (Manual Operation) at 190° C. with a 2.16 kilogram weight. Melt index, $I_{10}$, was determined in accordance with ASTM D1238 Procedure A at 190° C. with a 10 kilogram weight. High load melt index, $I_{21}$, in g/10 min was determined in accordance with ASTM D1238 Procedure A at 190° C. with a 21.6 kilogram weight. Melt flow ratio, MFR (also sometimes called melt index ratio) is $I_{21}/I_2$ unless otherwise stated.

Polymer density was determined in grams per cubic centimeter (g/cc) according to ASTM D792.

Molecular weight information ($M_w$, $M_n$ and $M_z$ in g/mol) and molecular weight distribution ($M_w/M_n$), and z-average molecular weight distribution ($M_z/M_w$) were analyzed by gel permeation chromatography (GPC), using an instrument sold under the trade name "Waters 150c", with 1,2,4-trichlorobenzene as the mobile phase at 140° C. The samples were prepared by dissolving the polymer in this solvent and were run without filtration. Molecular weights are expressed as polyethylene equivalents with a relative standard deviation of 2.9% for the number average molecular weight ("Mn") and 5.0% for the weight average molecular weight ("Mw"). Polymer sample solutions (1 to 2 mg/mL) were prepared by heating the polymer in 1,2,4-trichlorobenzene (TCB) and rotating on a wheel for 4 hours at 150° C. in an oven. The antioxidant 2,6-di-tert-butyl-4-methylphenol (BHT) was added to the mixture in order to stabilize the polymer against oxidative degradation. The BHT concentration was 250 ppm. Sample solutions were chromatographed at 140° C. on a PL 220 high-temperature chromatography unit equipped with four Shodex columns (HT803, HT804, HT805 and HT806) using TCB as the mobile phase with a flow rate of 1.0 mL/minute, with a differential refractive index (DRI) as the concentration detector. BHT was added to the mobile phase at a concentration of 250 ppm to protect the columns from oxidative degradation. The sample injection volume was 200 mL. The raw data were processed with Cirrus GPC software. The columns were calibrated with narrow distribution polystyrene standards. The polystyrene molecular weights were converted to polyethylene molecular weights using the Mark-Houwink equation, as described in the ASTM standard test method D6474.

The branch frequency of copolymer samples (i.e., the short chain branching, SCB per 1000 carbons) and the $C_6$ comonomer content (in wt %) was determined by Fourier Transform Infrared Spectroscopy (FTIR) as per the ASTM D6645-01 method. A Thermo-Nicolet 750 Magna-IR Spectrophotometer equipped with OMNIC version 7.2 a software was used for the measurements.

The determination of branch frequency as a function of molecular weight (and hence the comonomer distribution) was carried out using high temperature Gel Permeation Chromatography (GPC) and FT-IR of the eluent. Polyethylene standards with a known branch content, polystyrene and hydrocarbons with a known molecular weight were used for calibration.

Hexane extractables using compression molded plaques were determined according to ASTM D5227.

To determine the composition distribution breadth index $CDBI_{50}$ (which is also designated CDBI(50) in the present disclosure so that $CDBI_{50}$ and CDBI(50) are used interchangeably), a solubility distribution curve is first generated for the copolymer. This is accomplished using data acquired from the TREF technique (see below). This solubility distribution curve is a plot of the weight fraction of the copolymer that is solubilized as a function of temperature. This is converted to a cumulative distribution curve of weight fraction versus comonomer content, from which the $CDBI_{50}$ is determined by establishing the weight percentage of a copolymer sample that has a comonomer content within 50% of the median comonomer content on each side of the median (see WO 93/03093 for the definition of $CDBI_{50}$). The weight percentage of copolymer eluting at from 90 to 105° C., is determined by calculating the area under the TREF curve at an elution temperature of from 90 to 105° C. The weight percent of copolymer eluting below at or 40° C. and above 100° C. was determined similarly. For the purpose of simplifying the correlation of composition with elution temperature, all fractions are assumed to have a Mn≥15,000, where Mn is the number average molecular weight of the fraction. Any low weight fractions present generally represent a trivial portion of the polymer. The remainder of this description and the appended claims maintain this convention of assuming all fractions have Mn≥15,000 in the $CDBI_{50}$ measurement.

The specific temperature rising elution fractionation (TREF) method used herein was as follows. Homogeneous polymer samples (pelletized, 50 to 150 mg) were introduced into the reactor vessel of a crystallization-TREF unit (Polymer ChAR™). The reactor vessel was filled with 20 to 40 mL 1,2,4-trichlorobenzene (TCB), and heated to the desired dissolution temperature (e.g., 150° C.) for 1 to 3 hours. The solution (0.5 to 1.5 mL) was then loaded into the TREF column filled with stainless steel beads. After equilibration at a given stabilization temperature (e.g., 110° C.) for 30 to 45 minutes, the polymer solution was allowed to crystallize with a temperature drop from the stabilization temperature to 30° C. (0.1 or 0.2° C./minute). After equilibrating at 30° C. for 30 minutes, the crystallized sample was eluted with TCB (0.5 or 0.75 mL/minute) with a temperature ramp from 30° C. to the stabilization temperature (0.25 or 1.0° C./minute). The TREF column was cleaned at the end of the run for 30 minutes at the dissolution temperature. The data were processed using Polymer ChAR software, Excel spreadsheet and TREF software developed in-house.

The TREF procedures described above are well known to persons skilled in the art and can be used to determine the modality of a TREF profile, a $CDBI_{50}$, a copolymer wt % eluting at or below 40° C., a copolymer wt % eluting at above 100° C., a copolymer wt % eluting at from 90° C. to 105° C., a T(75)-T(25) value, as well as the temperatures or temperature ranges where elution intensity maxima (elution peaks) occur.

The melting points including a peak melting point ($T_m$) and the percent crystallinity of the copolymers are determined by using a TA Instrument DSC Q1000 Thermal Analyzer at 10° C./min. In a DSC measurement, a heating-cooling-heating cycle from room temperature to 200° C. or vice versa is applied to the polymers to minimize the thermo-mechanical history associated with them. The melting point and percent of crystallinity are determined by the primary peak temperature and the total area under the DSC curve respectively from the second heating data. The peak melting temperature $T_m$ is the higher temperature peak, when two peaks are present in a bimodal DSC profile (in some embodiments also having the greatest peak height).

The melt strength of a polymer is measured on Rosand RH-7 capillary rheometer (barrel diameter=15 mm) with a flat die of 2-mm Diameter, L/D ratio 10:1 at 190° C. Pressure Transducer: 10,000 psi (68.95 MPa). Piston Speed: 5.33 mm/min. Haul-off Angle: 52°. Haul-off incremental speed: 50-80 m/min$^2$ or 65±15 m/min$^2$. A polymer melt is extruded through a capillary die under a constant rate and then the polymer strand is drawn at an increasing haul-off speed until it ruptures. The maximum steady value of the force in the plateau region of a force versus time curve is defined as the melt strength for the polymer.

Dynamic Mechanical Analysis (DMA). Rheological measurements (e.g., small-strain (10%) oscillatory shear measurements) were carried out on a dynamic Rheometrics SR5 Stress rotational rheometer with 25 mm diameter parallel plates in a frequency sweep mode under full nitrogen blanketing. The polymer samples are appropriately stabilized with the anti-oxidant additives and then inserted into the test fixture for at least one minute preheating to ensure the normal force decreasing back to zero. All DMA experiments are conducted at 10% strain, 0.05 to 100 rad/s and 190° C. Orchestrator Software is used to determine the viscoelastic parameters including the storage modulus (G'), loss modulus (G"), phase angle (δ), complex modulus (G*) and complex viscosity (η*).

The complex viscosity |η*(ω)| versus frequency (ω) data were then curve fitted using the modified three parameter Carreau-Yasuda (CY) empirical model to obtain the zero shear viscosity $\eta_0$, characteristic viscous relaxation time $\tau_\eta$, and the breadth of rheology parameter-a. The simplified Carreau-Yasuda (CY) empirical model used is as follows:

$$|\eta^*(\omega)|=\eta_0/[1+(\tau_\eta\omega)^a]^{(1-n)/a}$$

wherein: |η*(ω)|=magnitude of complex shear viscosity; $\eta_0$=zero shear viscosity; $\tau_\eta$=characteristic relaxation time; a="breadth" of rheology parameter (which is also called the "Carreau-Yasuda shear exponent" or the "CY a-parameter" or simply the "CY breadth parameter" in the current disclosure); n=fixes the final power law slope, fixed at 2/11; and ω=angular frequency of oscillatory shearing deformation. Details of the significance and interpretation of the CY model and derived parameters may be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume 1, Fluid Mechanics*, 2nd Edition, John Wiley & Sons (1987); each of which is incorporated herein by reference in its entirety.

The Shear Thinning Index (SHI) was determined according to the method provided in U.S. Pat. Appl. No. 2011/0212315: the SHI is defined as SHI(ω)=η*(ω)/η0 for any given frequency (ω) for dynamic viscosity measurement, wherein η0 is zero shear viscosity @190° C. determined via the empiric Cox-Merz-rule. η* is the complex viscosity @190° C. determinable upon dynamic (sinusoidal) shearing or deformation of a copolymer as determined on a Rheometrics SR5 Stress rotational rheometer using parallel-plate geometry. According to the Cox-Merz-Rule, when the frequency (ω) is expressed in Radiant units, at low shear rates, the numerical value of η* is equal to that of conventional, intrinsic viscosity based on low shear capillary measurements. The skilled person in the field of rheology is well versed with determining η0 in this way. The shear thinning index provided in Table 2 is the shear thinning index at 0.1 rad/second.

The films of the current examples were made on a blown film line manufactured by Battenfeld Gloucester Engineering Company of Gloucester, Mass. using a die diameter of 4 inches, and a die gap of 35 or 50 mil. An Ingenia 1150 process aid masterbatch consisting of 1500 ppm of fluoropolymer compound was added to the inventive copolymers 2 and 3 and to the comparative copolymer 1 when the films were blown. This blown film line has a standard output of more than 100 pounds per hour and is equipped with a 50 horsepower motor. Screw speed was 35 to 50 RPM. The extender screw has a 2.5 mil diameter and a length/diameter (L/D) ratio of 24/1. Melt Temperature and Frost Line Height (FLH) are 430 to 440° F. and 17 inches respectively. The blown film bubble is air cooled. Typical blow up ratio (BUR) for blown films prepared on this line are from 1.5/1 to 4/1. An annular die having a gap of 35 mils was used for these experiments. The films of this example were prepared using a BUR aiming point of 2.5:1 and a film thickness aiming point of 1.0 mils.

The haze (%) was measured in accordance with the procedures specified in ASTM D 1003-07, using a BYK-Gardner Haze Meter (Model Haze-gard plus).

Dart impact strength was measured on a dart impact tester (Model D2085AB/P) made by Kayeness Inc. in accordance with ASTM D-1709-04 (method A).

Machine (MD) and transverse (TD) direction Elmendorf tear strengths were measured on a ProTear™ Tear Tester made by Thwing-Albert Instrument Co. in accordance with ASTM D-1922.

Puncture resistance was measured on a MTS Systems Universal Tester (Model SMT(HIGH)-500N-192) in accordance with ASTM D-5748.

MD or TD secant modulus was measured on an Instrument 5-Head Universal Tester (Model TTC-102) at a crosshead speed of 0.2 in/min up to 10% strain in accordance with ASTM D-882-10. The MD or TD secant modulus was determined by an initial slope of the stress-strain curve from an origin to 1% strain.

Film tensile testing was conducted on an Instrument 5-Head Universal Tester (Model TTC-102) in accordance with ASTM D-882-10.

Gloss was measured on a BYK-Gardner 45° Micro-Gloss unit in accordance with ASTM D2457-03.

Seal Initiation Temperature (SIT). A seal was prepared by clamping two 2.0 mil film strips between heated upper and lower seal bars on a SL-5 Sealer made by Lako Tool for 0.5 seconds, 40 psi seal bar clamping pressure for each temperature in the range from onset of seal to melt through. Seal strength or sealability parameter was measured as a function of seal temperature on an Instrument 5-Head Universal Tester (Model TTC-102) in accordance with ASTM F88-09.

Catalyst System Preparation

General Synthesis of (1-$C_6F_5CH_2$-Indenyl)((t-Bu)$_3$P=N)$TiCl_2$

To distilled indene (15.0 g, 129 mmol) in heptane (200 mL) was added BuLi (82 mL, 131 mmol, 1.6 M in hexanes) at room temperature. The resulting reaction mixture was stirred overnight. The mixture was filtered and the filter cake washed with heptane (3×30 mL) to give indenyllithium (15.62 g, 99% yield). Indenyllithium (6.387 g, 52.4 mmol) was added as a solid over 5 minutes to a stirred solution of $C_6F_5CH_2$—Br (13.65 g, 52.3 mmol) in toluene (100 mL) at room temperature. The reaction mixture was heated to 50° C. and stirred for 4 h. The product mixture was filtered and washed with toluene (3×20 mL). The combined filtrates were evaporated to dryness to afford 1-$C_6F_5CH_2$-indene (13.58 g, 88%). To a stirred slurry of $TiCl_4$.2THF (1.72 g, 5.15 mmol) in toluene (15 mL) was added solid (t-Bu)$_3$P=N—Li (1.12 g, 5 mmol) at room temperature. The resulting reaction mixture was heated at 100° C. for 30 min and then allowed to cool to room temperature. This mixture containing ((t-Bu)$_3$P=N)TiCl$_3$ (1.85 g, 5 mmol) was used in the next reaction. To a THF solution (10 mL) of 1—$C_6F_5CH_2$-indene (1.48 g, 5 mmol) cooled at −78° C. was added n-butyllithium (3.28 mL, 5 mmol, 1.6 M in hexanes) over 10 minutes. The resulting dark orange solution was stirred for 20 minutes and then transferred via a double-ended needle to a toluene slurry of ((t-Bu)$_3$P=N)TiCl$_3$ (1.85 g, 5 mmol). The cooling was removed from the reaction mixture which was stirred for a further 30 minutes. The solvents were evaporated to afford a yellow pasty residue. The solid was re-dissolved in toluene (70 mL) at 80° C. and filtered hot. The toluene was evaporated to afford pure (1-$C_6F_5CH_2$-Indenyl)((t-Bu)$_3$P=N)TiCl$_2$ (2.35 g, 74%).

Preparation of Supported Catalyst.

Sylopol 2408 silica purchased from Grace Davison was calcined by fluidizing with air at 200° C. for 2 hours and subsequently with nitrogen at 600° C. for 6 hours. 114.273 grams of the calcined silica was added to 620 mL of toluene. 312.993 g of a MAO solution containing 4.5 weight % Al purchased from Albemarle was added to the silica slurry quantitatively. The mixture was stirred for 2 hours at ambient temperature. The stirring rate should be such so as not to break-up the silica particles. 2.742 grams of (1-$C_6F_5CH_2$-Indenyl)((t-Bu)$_3$P=N)TiCl$_2$ (prepared as above) was weighed into a 500-mL Pyrex bottle and 300 mL of toluene added. The metal complex solution was added to the silica slurry quantitatively. The resulting slurry was stirred for 2 hours at ambient temperature. Next, 21.958 g of 18.55 wt % toluene solution of pre-dried Armostat® 1800 was weighed into a small vessel and transferred quantitatively to the silica slurry. The resulting mixture was stirred for a further 30 minutes after which the slurry was filtered, yielding a clear filtrate. The solid component was washed with toluene (2×150 mL) and then with pentane (2×150 mL). The final product was dried in vacuo to between 450 and 200 mtorr and stored under nitrogen until used. The finished catalyst had a pale yellow to pale orange color. The catalyst had 2.7 wt % of Armostat present.

General Polymerization Conditions

Continuous ethylene/1-butene gas phase copolymerization experiments were conducted in a 56.4 liter technical scale reactor (TSR) in continuous gas phase operation (for an example of a TSR reactor set up see European Patent Application No. 659,773A1). Ethylene polymerizations were run at 82.5° C., 85° C., 87.4° C., 90° C. and 92.5° C. with a total operating pressure of 300 pounds per square inch gauge (psig). Gas phase compositions for ethylene, 1-butene and hydrogen were controlled via closed-loop process control to values of 45-70 (actual runs were at 60%), 3-6 (actual runs were 5.2-5.5) and 0.018-0.042 (actual runs were 0.036-0.038) mole percent, respectively. Nitrogen constituted the remainder of the gas phase mixture (approximately 35 mole %). Typical production rate for these conditions was 2.0 to 3.0 kg of polyethylene per hour.

A seed-bed used prior to polymerization start-up was washed with a small amount of triethylaluminum, TEAL to scavenge impurities. Prior to introduction of the catalyst, TEAL was flushed from the reactor. The experiment was started by metering catalyst to the reactor to initiate polymerization. The polymerization reaction was initiated under conditions of low comonomer concentration, followed by gradual adjustment of the comonomer to ethylene ratio to provide the targeted polymer density. The level of hydrogen was also adjusted to control the melt index of the polymer. In instances where the experiment was transitioned from another experiment, process conditions (i.e., temperature, comonomer and hydrogen) were altered slowly to avoid abrupt changes that can disrupt reactor continuity. The residence time in the reactor was held at 1.6-2.0 hr, with a production rate range from 2.3-2.9 kg/hr. Steady state polymerization conditions for the production of inventive ethylene/1-butene copolymers 1-5 are provided in Table 1.

Pelletization of Granular Resins.

500 ppm of Irganox 1076 and 1000 ppm of Irgafos 168 were dry blended with the granular resin prior to pelletization. The resulting powder blend was extruded on Leistritz twin-screw extruder with a screw diameter of 38 mm and L/D ratio of 33/1 under nitrogen atmosphere to minimize polymer degradation. The pelletization conditions of the extruder were set at a melt temperature of 210° C. an output rate of 8 to 10 lb/hr, a screw speed of 120 rpm and a pelletizer speed of 25 to 35 rpm. The pelleted resin was cooled and then collected for the resin characterization and film evaluation.

Polymer data for three of the inventive ethylene/butene copolymers, inventive copolymers 1-3, along with a comparative ethylene/butene copolymer, comparative copolymer 1, are provided in Table 2. A comparative ethylene/1-hexene copolymer, comparative copolymer 2a is also included in Table 2. Comparative copolymer 2a was made according to the method disclosed in U.S. Patent Application Publication No. 2014/0100343A1 (see specifically inventive resin 5). The GPC-RI, GPC-FTIR, TREF and DSC of inventive copolymer 2 as well as comparative copolymer 1 are provided in FIGS. 1, 2, 3 and 4, respectively. The comparative ethylene/butene copolymer, comparative copolymer 1 is made in the gas phase using a Ziegler-Natta catalyst and is commercially available from NOVA Chemicals Corporation under the trademark NOVAPOL® PF-0118-F. Film data for films made from inventive and comparative ethylene/butene copolymers are provided in Table 3.

Figure 5:
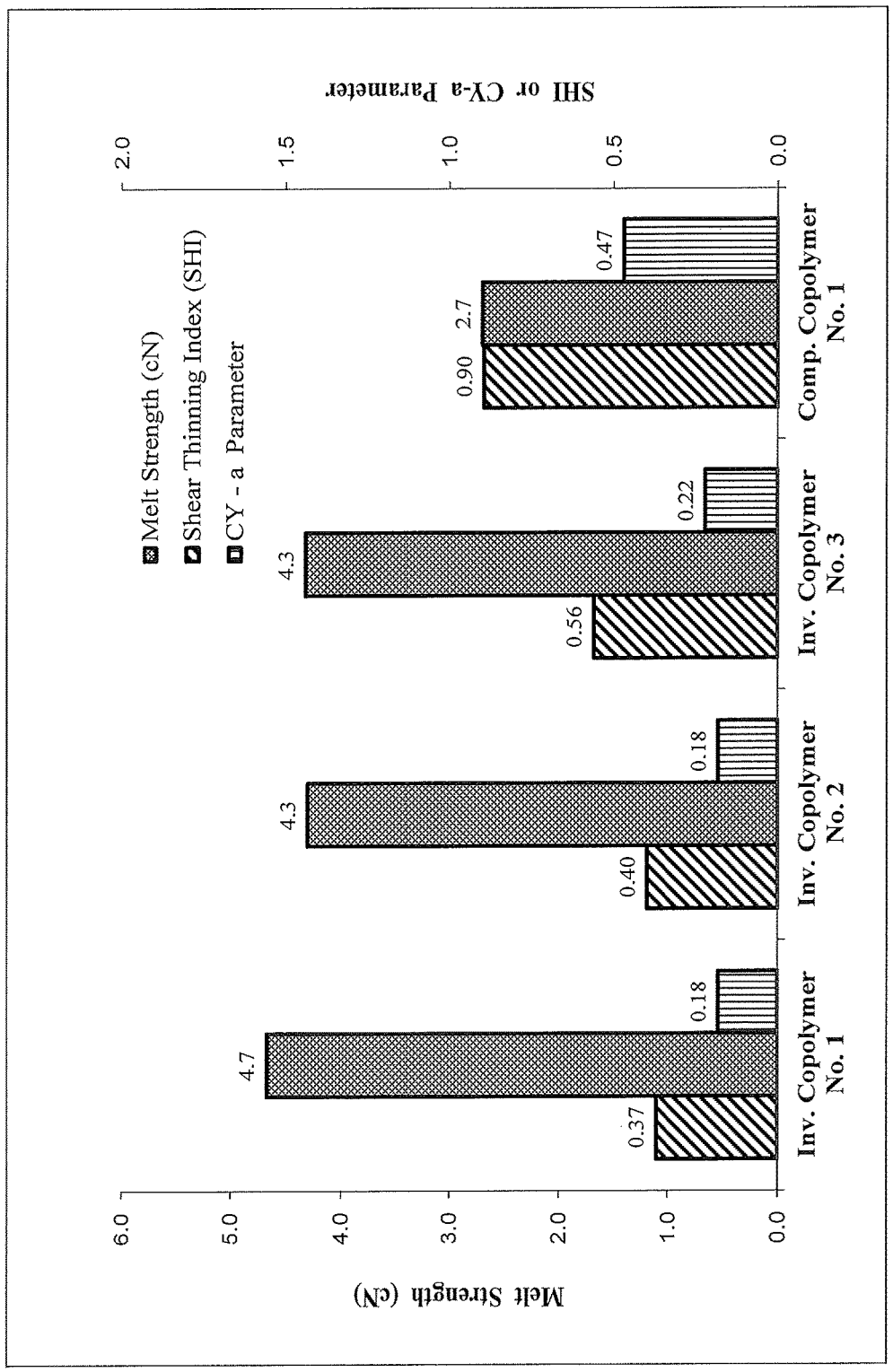
FIG. 5 shows the melt strength, shear thinning index, and CY-a parameter for inventive and comparative ethylene/1-butene copolymers.

The melt strength (defined as $\sigma^{MS}$, is the accelerated haul-off melt strength determined at 190° C.), the shear thinning index (SHI) and the CY a parameter data for Inventive copolymers 1-3 are shown in Table 2 and FIG. 5 along with the comparative ethylene/butene copolymer 1. From the data provided in Table 2 and in FIG. 5, a person skilled in the art would recognize that the inventive ethylene/butene copolymers 1-3 have exceptional melt strength and enhanced shear thinning characteristics when compared to the NOVAPOL PF-0118-F copolymer (i.e., comparative copolymer 1). The inventive ethylene/butene copolymers 1-3 have lower shear thinning index (SHI) or Carreau-Yasuda a-parameter values than comparative copolymer 1 at similar melt index $I_2$, melt flow ratio ($I_{21}/I_2$) and density. This is consistent with enhanced shear thinning characteristics for the inventive ethylene/1-butene copolymers. These features are well known to improve bubble stability during a blown film process as well as extruder throughput in a film conversion processes. As a result, the inventive ethylene/1-butene copolymers allow for increased output rates during film production. Without wishing to be bound by theory, increased output rates lead to improved economics for polymer processing and end-use applications. This is further confirmed by the data in Table 3. The data in Table 3 shows that for a similar density, melt index and melt flow ratio, inventive copolymers 2 and 3 have lower extruder back pressures relative to comparative copolymer 1, higher specific output relative to comparative copolymer 1, and lower specific energy relative to comparative copolymer 1. This is consistent with an improvement in the specific output rate or energy consumption over the comparative ethylene/butene copolymer during the film conversion, due to the enhanced rheologicial properties of the inventive ethylene/1-butene copolymers.

In an effort to better understand the polymer architecture of inventive copolymers 1-5 and how it is different not only from comparative copolymer 1, but also other ethylene copolymers including copolymers of ethylene and 1-hexene and ethylene and 1-octene, rheological testing results were combined with certain resin parameters or properties to characterize the inventive ethylene/butene copolymers.

Figure 6:
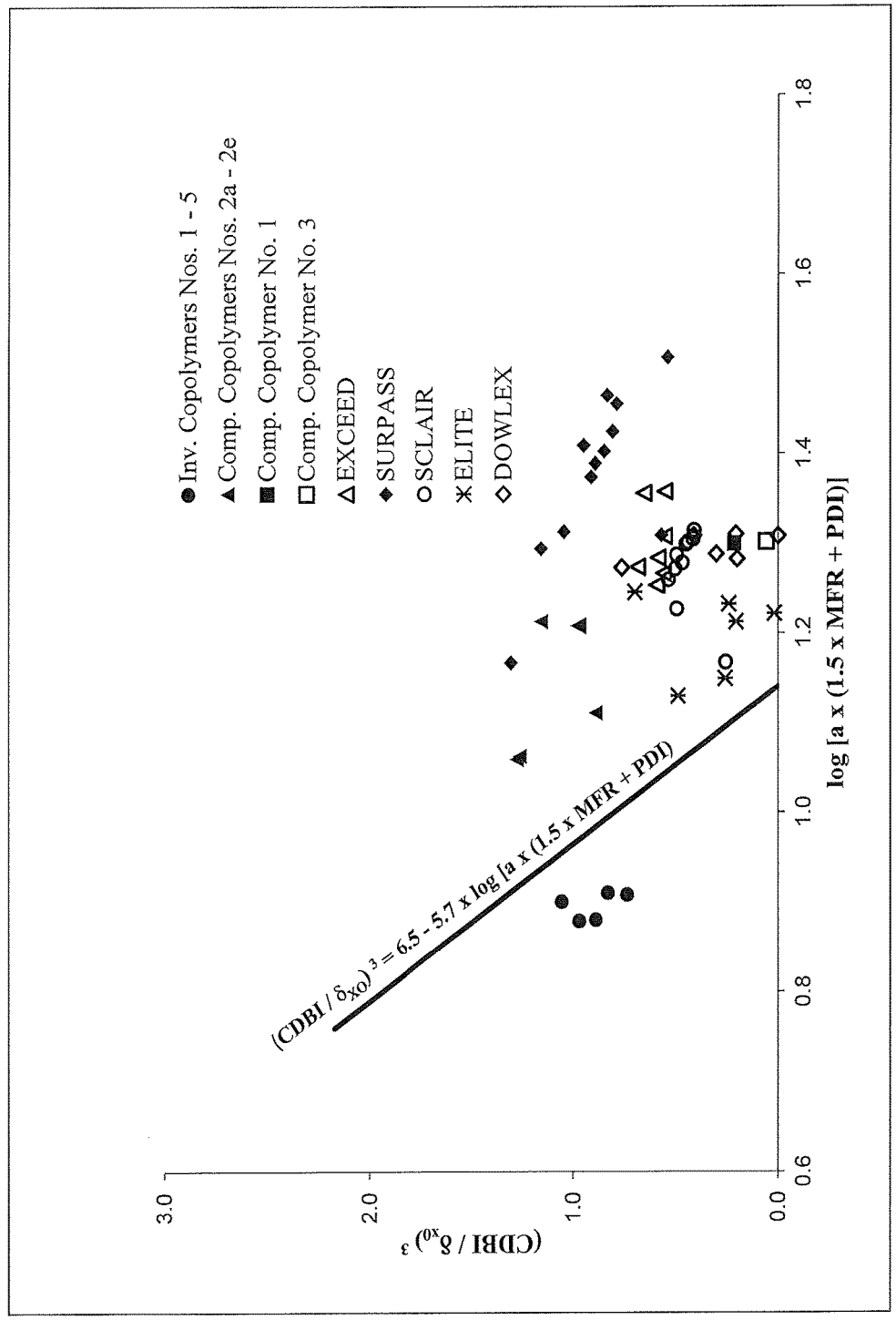
FIG. 6 shows a plot of the equation: $(CDBI_{50}/\delta_{XO})^{3.0}=6.5-5.7 \log [a(1.5(I_{21}/I_2)+(M_w/M_n))]$. The values from the equation $(CDBI_{50}/\delta_{XO})^{3.0}$ (the y-axis) are plotted against the corresponding log $[a(1.5(I_{21}/I_2)+(M_w/M_n))]$ values (the x-axis) for inventive ethylene/1-butene copolymers 1-5 as well as for several comparative resins.

FIG. 6, shows how the melt flow ratio ($I_{21}/I_2$), the molecular weight distribution ($M_w/M_n$), the comonomer distribution index ($CDBI_{50}$) and the rheologically determined parameters, the CY-a parameter and the crossover phase angle ($\delta_{XO}$) interrelate in the inventive ethylene/butene copolymers as well as for a number of comparative ethylene copolymers. Comparative copolymer 1, is the ethylene/1-butene Novapol resin described above. Comparative copolymers 2a-2e, in FIG. 6, are ethylene/1-hexene copolymers made substantially according to the method disclosed in U.S. Patent Application Publication No. 2014/0100343 A1. Hence, comparative copolymers 2a-2e are made using the same catalyst system used here, but the copolymers 2a-2e comprise ethylene and 1-hexene instead of ethylene and 1-butene. Comparative copolymer 3 is an ethylene/1-hexene copolymer made with a conventional Ziegler-Natta catalyst in the gas phase. Further comparative copolymers included in FIG. 6, are identified by their trademarks and include Elite™, Exceed™, Dowlex™, SURPASS®, and SCLAIR®. All the comparative resins have a melt index I2 of 1.5 g/10 min or less and a density of between 0.916 and 0.930 g/cm³. EXCEED™ is an ethylene/1-hexene copolymer while Elite™, Dowlex™, SURPASS®, and SCLAIR®, are ethylene/1-octene copolymers. FIG. 6 shows a plot of the equation: $(CDBI_{50}/\delta_{XO})^{3.0} = 6.5-5.7 \log [a(1.5(I_{21}/I_2)+(M_w/M_n))]$, as well as a plot of the $(CDBI_{50}/\delta_{XO})^{3.0}$ vs log $[a(1.5(I_{21}/I_2)+(M_w/M_n))]$ values for the inventive ethylene/butene copolymers 1-5 and for the comparative copolymer resins. As can be seen from FIG. 6, none of the comparative copolymers satisfy the condition $(CDBI_{50}/\delta_{XO})^{3.0} \leq 6.5-5.7 \log [a(1.5(I_{21}/I_2)+(M_w/M_n))]$. In contrast all of the inventive ethylene/butene copolymers satisfy the condition $(CDBI_{50}/\delta_{XO})^{3.0} \leq 6.5-5.7 \log [a(1.5(I_{21}/I_2)+(M_w/M_n))]$. Of particular note is the different polymer architecture observed for the inventive ethylene/1-butene copolymers 1-5 when compared to the ethylene/1-hexene comparative copolymers 2a-2e. Since both polymers are made with the same catalyst (i.e., a supported phosphinimine catalyst having a substituted indenyl ligand) under similar polymerization conditions, the highly different polymer architectures is somewhat surprising and indicates that comonomer type (1-butene vs 1-hexene) strongly influences the polymer architecture produced during ethylene copolymerization with these catalyst systems.

Figure 7:
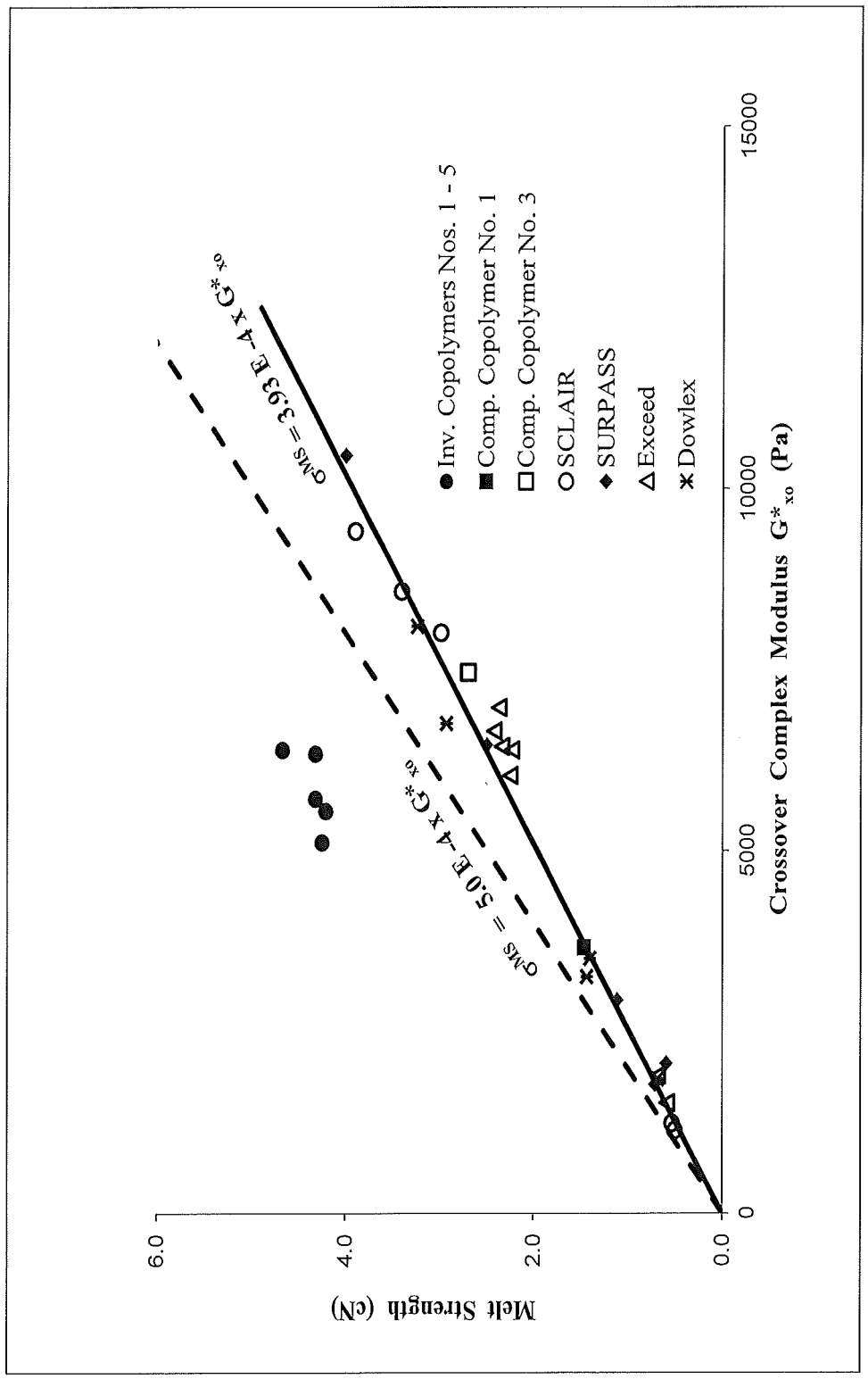
FIG. 7 shows a plot of the equations: $\sigma^{MS}=5.0\times10^{-4}\times G^*_{XO}$ and $\sigma^{MS}=3.93\times10^{-4}\times G^*_{XO}$. The values for melt strength, $\sigma^{MS}$ (the y-axis) are plotted against the corresponding $G^*_{XO}$ values (the x-axis) for inventive ethylene/1-butene copolymers 1-5 as well as for several comparative resins.

FIG. 7 shows the relationship between accelerated haul-off melt strength "$\sigma^{MS}$" and the crossover complex modulus "$G^*_{XO}$" for inventive ethylene/butene copolymers 1-5 as well as for a number of comparative ethylene copolymers which are as already identified above. All comparative resins have a melt index I2 of 1.5 g/10 min or less and a density of between 0.916 and 0.930 g/cm³. As can be seen in FIG. 7, each of the comparative copolymers fall on or close to the line defined by the equation $\sigma^{MS} = 3.93 \times 10^{-4} \times G^*_{XO}$ while the inventive ethylene/1-butene copolymers 1-5 have much higher accelerated haul-off values and hence satisfy the condition $\sigma^{MS} > 5.0 \times 10^{-4} \times G^*_{XO}$.

Figure 8:
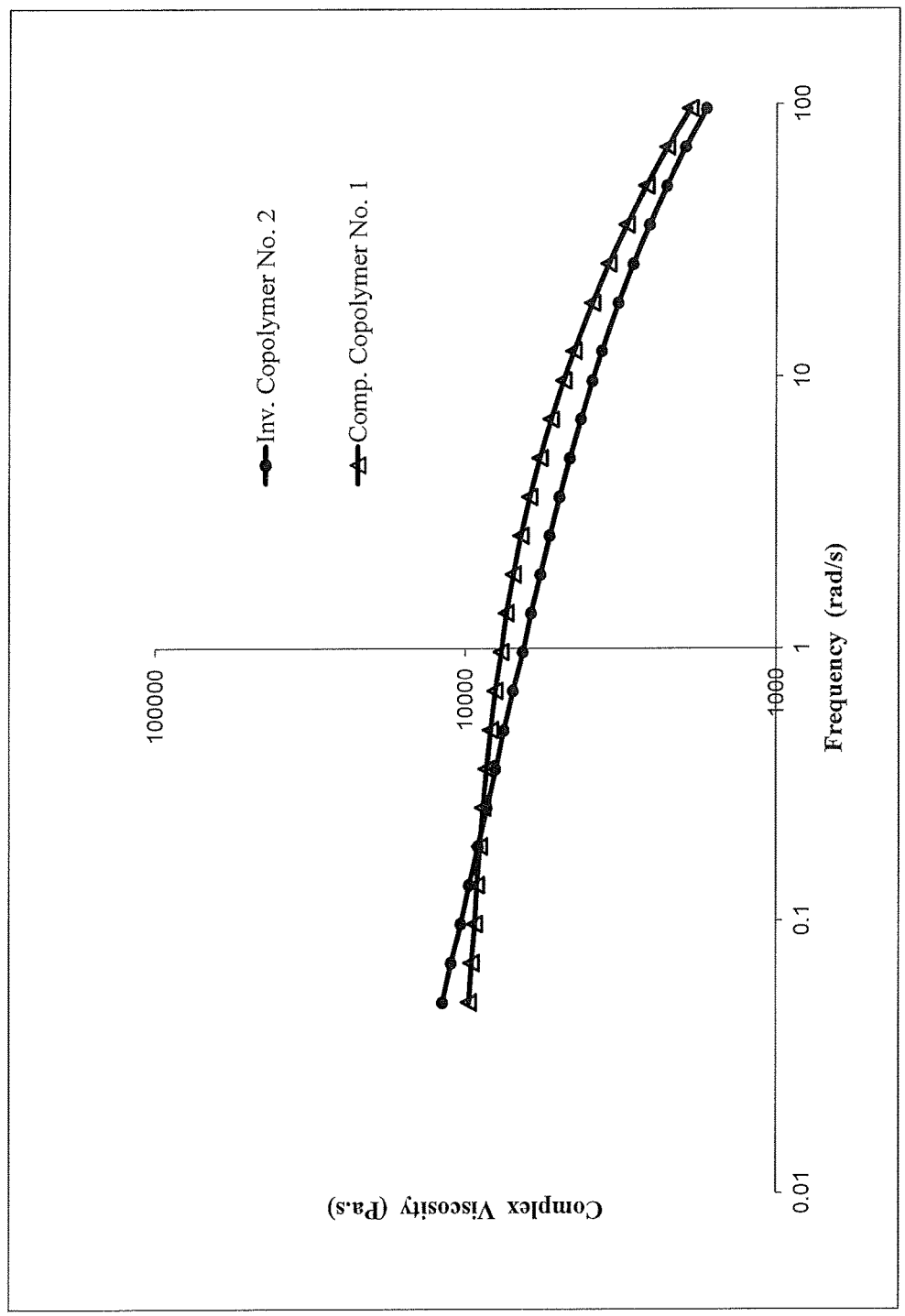
FIG. 8 shows a plot of the complex viscosity vs. the frequency for an inventive and comparative ethylene/1-butene resin.

FIG. 8 shows the relationship between complex viscosity and frequency for inventive ethylene/1-butene copolymer 2 as well as for comparative copolymer 1. Considering the data in Table 2 along with FIG. 8, the inventive ethylene copolymer shows higher shear thinning than the comparative ethylene/1-butene copolymer as exemplified by the lower shear thinning index or lower CY a parameter of the inventive copolymer at a similar melt flow ratio and polydispersity. Without wishing to be bound by theory, the higher low-shear complex viscosity of the inventive copolymer 2 (see FIG. 8) also accounts for the higher melt strength relative to comparative ethylene/1-butene copolymer 1.

The data in FIGS. 7 and 8 show that for similar melt index or crossover complex modulus ($G^*_{XO}$), the inventive ethylene/1-butene copolymers have exceptionally high melt strength or enhanced shear thinning characteristics as compared to the conventional ethylene/butene copolymer, comparative copolymer 1. Without wishing to be bound by theory, this would improve the bubble stability and extruder throughput during film conversion; and hence increase the output rate to make the film production more cost competitive for the end-uses.

A person skilled in the art will, in view of FIGS. 5-8, understand that the compositions and melt rheology of the inventive ethylene/butene copolymers are fundamentally different from that of the comparative ethylene/alpha-olefin copolymers.

A van Gurp-Palmen (VGP) analysis is a means by which to study a polymer architecture (e.g. molecular weight distribution, linearity, etc.) as reflected by the polymer melt morphology. A VGP curve is simply a plot of the phase angle ($\delta$) versus complex modulus ($G^*$), where the two rheology parameters are obtained using the frequency sweep test in dynamic mechanical analysis (DMA). A shift of a VGP curve from a baseline curve or a decrease in the phase angles at the mid-range of complex modulus may indicate changes in the polymer melt morphology.

A VGP plot allows for a determination of the crossover rheology parameter which is defined as the intersecting point obtained between the phase angle ($\delta$) vs. complex modulus ($G^*$) plot and a phase angle ($\delta$) vs. complex viscosity ($\eta^*$) plot. Based on a linear viscoelasticity theory, the VGP crossover rheology parameter or "crossover phase angle" ($\delta_{XO}$) occurs at a frequency ($\omega$) which is equal to unity. It is the phase angle at which the $G^*$ and the $\eta^*$ are numerically equivalent. The $G^*_{XO}$ can be similarly defined. It is the crossover complex modulus at a frequency of 1 rad/second. Hence the VGP crossover rheology parameter $\delta_{XO}$ and the crossover complex modulus $G^*_{XO}$ can be determined in a single DMA test.

Figure 9:
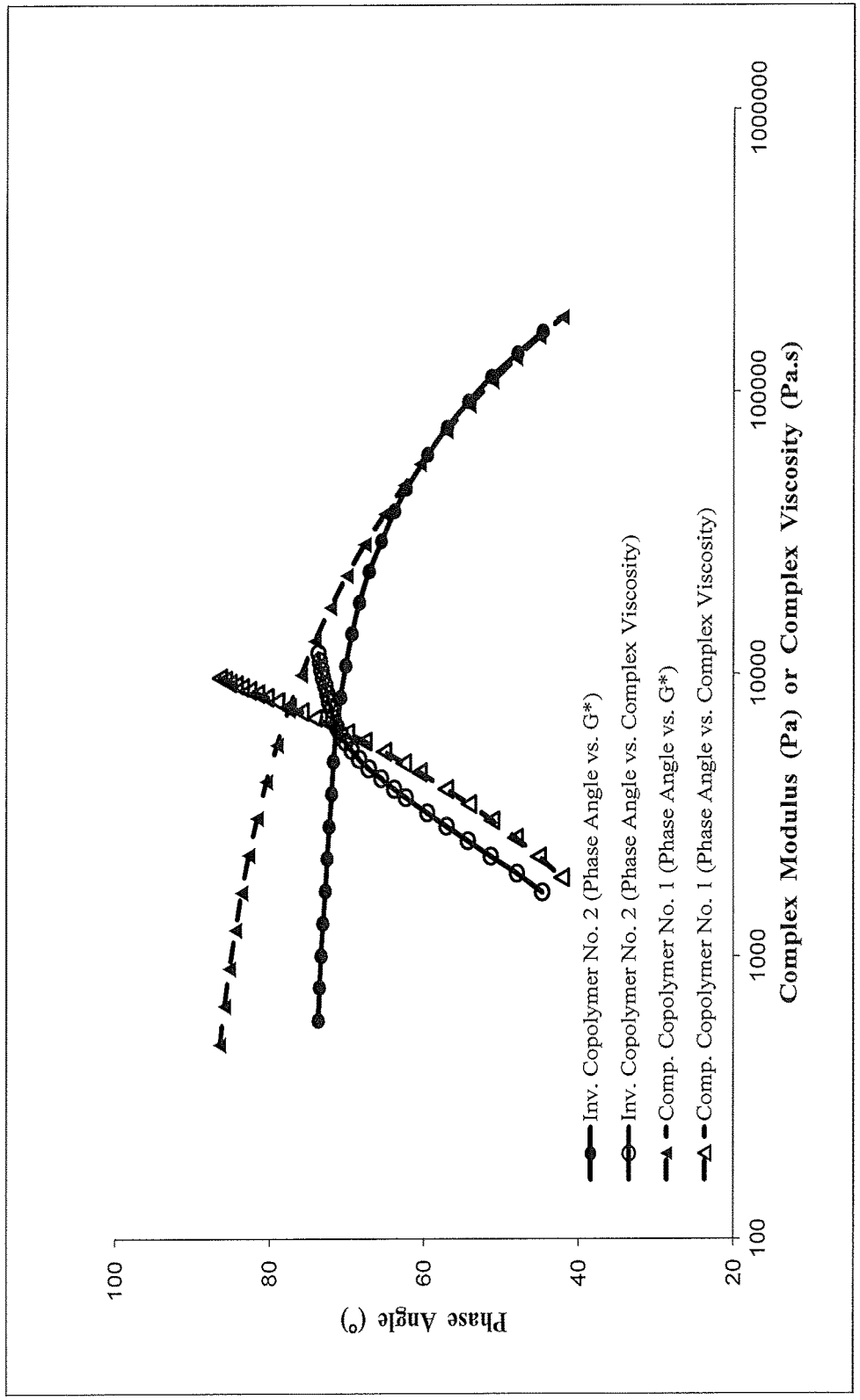
FIG. 9 show plots of the phase angle vs. the complex modulus and the phase angle vs. complex viscosity for an inventive and comparative ethylene/1-butene resin as determined by dynamic mechanical analysis (DMA).

The VGP crossover plots for inventive copolymer 2 along with comparative copolymer 1 are shown in FIG. 9. The VGP crossover points are dependent upon the copolymer architecture. In some embodiments for resins that are easier to process such as inventive copolymer 1, the VGP phase angle at which crossover occurs, defined as $\delta_{XO}$, is lower than for resins which are more difficult to process such as comparative copolymer 1. For resins that are easier to process, the shape of the phase angle-complex viscosity curves and the shape of the phase-angle complex modulus curves, are deflected somewhat and more closely resemble mirror images of each other, relative to the curves obtained for resins which are more difficult to process.

The van Gurp-Palmen (VGP) plot shows that the phase angle (δ) in the mid-range of complex modulus (G*) for the inventive ethylene/butene copolymer 1 is lower than that for comparative copolymer 1 (see FIG. 9). Without wishing to be bound by theory, the lower phase angle possibly indicates the presence of sparse long chain branching in the inventive copolymer, which may account for the improvement in the melt strength, shear thinning and CY a-parameter values shown in FIG. 5 for the inventive ethylene/butene copolymers 1-3 which are made with a single site catalyst relative to comparative ethylene/butene copolymer 1 which is made with a Ziegler-Natta catalyst.

The enhancement in melt rheology observed for the inventive ethylene/1-butene copolymers is very useful for high throughput film processing, particularly on the film lines with extruder current, back pressure or screw speed limitations. The improvement in processability described above for the inventive copolymers, is important because, in some embodiments, the processing characteristics may be considered more valuable than performance characteristics in most applications for ethylene/butene copolymers as they are generally not sold into high performance markets.

Figure 10:
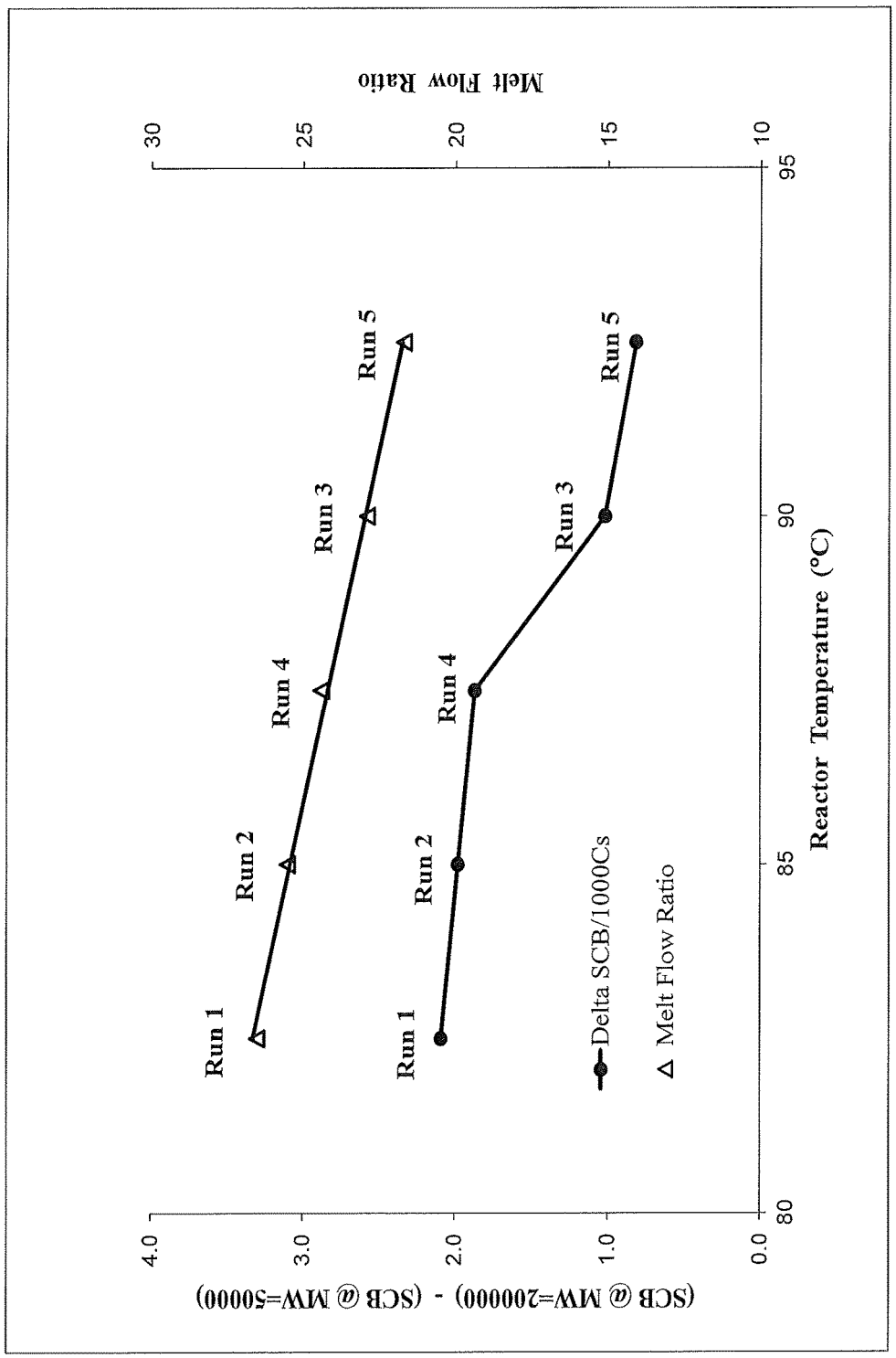
FIG. 10 shows how the values for SCB/1000C at MW of 200,000-SCB/1000C at MW of 50,000 and melt flow ratio ($I_{21}/I_2$) change with temperature in embodiments of the present disclosure.

Finally, the data provided in FIG. 10, along with the data provided in Table 1, show that the composition of the inventive ethylene/butene copolymers may be tailored somewhat by temperature control. The reactor temperature shows significant impact on the melt flow ratio ($I_{21}/I_2$) and the degree to which comonomer (e.g. 1-butene) is incorporated into the higher molecular weight fractions of the copolymer. An increase in temperature tends to decrease the melt flow ratio and to decrease the amount of comonomer incorporated into the high molecular weight portions of the polymer.

TABLE 1

|  | TSR Polymerization Run No. | | | | |
| --- | --- | --- | --- | --- | --- |
|  | 1 | 2 | 3 | 4 | 5 |
| Inventive Copolymer No. | Inv. Copolymer 1 | Inv. Copolymer 2 | Inv. Copolymer 3 | Inv. Copolymer 4 | Inv. Copolymer 5 |
| Density (g/cm³) | 0.9185 | 0.9189 | 0.9191 | 0.9195 | 0.9186 |
| $I_2$ (g/10 min) | 1.14 | 1.14 | 1.27 | 1.30 | 1.38 |
| MFR ($I_{21}/I_2$) | 26.5 | 25.5 | 22.9 | 24.4 | 21.7 |
| SCB/1000 C at MW = 200000-SCB/1000 C at MW = 50000 | 2.4 | 2.0 | 1.0 | 1.9 | 0.8 |
| Productivity (g PE/g Cat) | 2362 | 2359 | 2259 | 2630 | 2190 |
| Ethylene (mole %) | 60.1 | 60.0 | 60.0 | 60.0 | 60.0 |
| Hydrogen (mol %) | 0.037 | 0.037 | 0.037 | 0.038 | 0.038 |
| Butene (mol %) | 5.2 | 5.2 | 5.3 | 5.2 | 5.5 |
| C4/C2 in Reactor (mol/mol gas composition) | 0.0868 | 0.0866 | 0.0888 | 0.0874 | 0.0922 |
| H2/C2 in Reactor (mol/mol gas composition) | 0.00062 | 0.00061 | 0.00062 | 0.00063 | 0.00063 |
| Temp (° C.) | 82.4 | 85.1 | 90.0 | 87.4 | 92.6 |
| Production rate (kg/hr) | 2.5 | 2.9 | 2.8 | 2.5 | 2.3 |
| Residence Time (hrs) | 1.7 | 1.6 | 1.6 | 1.8 | 1.9 |
| Bulk Density (lb per cubic foot) | 22.0 | 22.0 | 23.4 | 22.5 | 24.8 |

NOTE:
H2 = hydrogen,
C2 = ethylene,
C4 = 1-butene

TABLE 2

Polymer Properties

|  | Copolymer | | | | |
| --- | --- | --- | --- | --- | --- |
|  | Inv. Copolymer 1 (ethylene/1-butene) | Inv. Copolymer 2 (ethylene/1-butene) | Inv. Copolymer 3 (ethylene/1-butene) | Comp. Copolymer 1 (ethylene/1-butene) | Comp. Copolymer 2a (ethylene/1-hexene) |
| Density (g/cc) | 0.9185 | 0.9189 | 0.9191 | 0.9192 | 0.9224 |
| Melt Index, $I_2$ (g/10 min) | 1.14 | 1.14 | 1.27 | 0.96 | 0.56 |
| MFR ($I_{21}/I_2$) | 26.5 | 25.5 | 22.9 | 24.9 | 43 |
| $I_{10}/I_2$ | 7.9 | 7.7 | 7.1 | 7.3 | 10.3 |
| TREF Profile | Bimodal, T(high) = 92.2° C. T(low) = 72.8° C. | Bimodal, T(high) = 92.3° C. T(low) = 74.8° C. | Bimodal, T(high) = 92.4° C. T(low) = 75.6° C. | Bimodal, T(high) = 94.1° C. T(low) = 84.3° C. | Bimodal, T(high) = 93.2° C. T(low) = 74.4° C. |
| T(high) − T(low) (° C.) | 19.4 | 17.5 | 16.8 | 9.8 | 18.8 |
| wt % at 90-105° C. | 5.6 | 5.9 | 6.0 | 20.7 | 14.6 |
| wt % at >100° C. | 0 | 0 | 0 | 0 | 0 |
| T(75) − T(25) (° C.) | 13.6 | 13.0 | 13.2 | 20.8 | 13.3 |
| CDBI-50 (wt %) | 70.7 | 70.8 | 69.8 | 46.7 | 65.1 |
| GPC-FTIR | Slight Reversed | Slight Reversed | Slight Reversed | Normal | Reverse |

TABLE 2-continued

Polymer Properties

| | Copolymer | | | | |
|---|---|---|---|---|---|
| | Inv. Copolymer 1 (ethylene/1-butene) | Inv. Copolymer 2 (ethylene/1-butene) | Inv. Copolymer 3 (ethylene/1-butene) | Comp. Copolymer 1 (ethylene/1-butene) | Comp. Copolymer 2a (ethylene/1-hexene) |
| DSC melt Temp. (° C.) | 106.0/118.5 | 106.8/118.6 | 107.6/118.4 | 110.3/121.4 | 106.6, 120.7 |
| % crystallinity | 43.3 | 41.7 | 44.4 | 44.3 | 48.3 |
| CY a Parameter | 0.1837 | 0.1835 | 0.2165 | 0.4740 | 0.2320 |
| Mn | 29709 | 35974 | 30201 | 38141 | 20438 |
| Mw | 106332 | 108496 | 97886 | 118679 | 121308 |
| Mz | 285190 | 270538 | 225382 | 323429 | 359545 |
| Mw/Mn | 3.58 | 3.02 | 3.24 | 3.11 | 5.94 |
| Mz/Mw | 2.68 | 2.49 | 2.30 | 2.73 | 2.96 |
| C6 Content (wt %) | 7.3 | 7.2 | 7.0 | 7.6 | 6.8 |
| C6 Content (mole %) | 3.8 | 3.7 | 3.6 | 3.9 | 2.4 |
| SCB/1000 C | 19 | 18.5 | 18.1 | 19.7 | 11.9 |
| Hexane Extractables (%) | 0.78 | 0.75 | 0.76 | 0.48 | 0.90 |
| AHO Melt Strength $\sigma^{MS}$ (cN) | 4.67 | 4.32 | 4.32 | 2.65 | 6.00 |
| VGP Crossover Complex Modulus $G^*_{xo}$ (Pa) | 6395 | 6340 | 5721 | 7463 | 11412 |
| VGP Crossover Phase Angle $\delta_{xo}$ (°) | 69.4 | 71.4 | 74.2 | 77.6 | 62.01 |
| SCB/1000 C at MW = 200000 − SCB/1000 C at MW = 50000 | 2.4 | 2.0 | 1.0 | −0.4 | 5.9 |
| Shear Thinning Index SHI @ 0.1 rad/s | 0.37 | 0.40 | 0.56 | 0.88 | 0.34 |
| $(CDBI/\delta_{xo})^3 \leq 6.5 - 5.7 \times \log[a \times (1.5 \times MFR + PDI)]$ | Yes (1.06 < 1.37) | Yes (0.98 < 1.49) | Yes (0.83 < 1.31) | No (0.22 > −0.81) | No (1.16 > −0.42) |
| $\sigma^{MS} \geq 5.0E{-}4 \times G^*_{xo}$ | Yes (4.67 > 3.20) | Yes (4.32 > 3.17) | Yes (4.32 > 2.86) | No (2.65 < 3.73) | Yes (6.00 > 5.71) |

TABLE 3

Film Properties

| | Ethylene/1-Butene Copolymer | | |
|---|---|---|---|
| | Inv. Copolymer 2 (ethylene/1-butene) | Inv. Copolymer 3 (ethylene/1-butene) | Comp. Copolymer 1 (ethylene/1-butene) |
| Density (g/cc)/MI (g/10 min) | 0.9189/1.14 | 0.9191/1.27 | 0.9192/0.96 |
| Ingenia 1150 PPA (ppm) | 1500 | 1500 | 1500 |
| Dart Impact (g/mil) | 118 | 121 | 120 |
| MD Tear/TD Tear (g/mil) | 31/260 | 29/258 | 130/359 |
| TEF & LUB Puncture (J/mm) | 38 | 30 | 42 |
| Puncture Energy (J/mm) | 54 | 59 | 54 |
| Puncture Peak Force (lb) | 6.1 | 6.3 | 5.2 |
| 1% MD Secant Modulus (MPa) | 189 | 198 | 174 |
| 1% TD Secant Modulus (MPa) | 204 | 207 | 215 |
| MD Tensile Strength (MPa) | 34.7 | 35.6 | 44.6 |
| TD Tensile Strength (MPa) | 28.8 | 30.7 | 33.1 |
| MD Elongation at Break (%) | 565 | 593 | 608 |
| TD Elongation at Break (%) | 720 | 748 | 833 |
| Gloss (%)/Haze (%) | 52.5/9.8 | 59.9/8.2 | 59.3/9.7 |
| SIT@4.4N (° C.)/Max. Force (N) | 109.5/26.1 | 109.9/25.9 | 107.3/20.8 |
| Extruder Pressure (psi) | 3395-3425 | 3390-3440 | 3930-3990 |
| Specific Output (lb/hr/rpm) | 2.56 | 2.56 | 2.44 |
| Specific Power (lb/hr/amp) | 2.99 | 2.99 | 2.70 |
| Specific Energy (W/lb/hr) | 60.3 | 60.3 | 70.3 |

What is claimed is:

1. A process for making an ethylene/1-butene copolymer, the process comprising polymerizing ethylene and 1-butene with a single site catalyst system in a gas phase polymerization reactor, wherein the ethylene/1-butene copolymer has density of from 0.912 to 0.94 g/cm³, a melt index (I2) of from 0.5 to 10 g/10 min, a melt flow ratio (I21/I2) of from 20 to 35, a molecular weight distribution ($M_w/M_n$) of from 2.0 to 4.5, and an accelerated haul-off melt strength ($\sigma^{MS}$) as determined by Rosand capillary rheometry at 190° C., of at least 3.0 cN; wherein the single site catalyst system comprises a phosphinimine catalyst, a cocatalyst and an inert support.

2. The process of claim 1 wherein the phosphinimine catalyst has the formula:

wherein $R^¥$ is a substituted or unsubstituted alkyl group, a substituted or an unsubstituted aryl group, or a substituted or unsubstituted benzyl group, wherein substituents for the alkyl, aryl or benzyl group are selected from alkyl, aryl, alkoxy, aryloxy, alkylaryl, arylalkyl and halide substituents; and wherein X is an activatable ligand.

3. A process for making an ethylene/1-butene copolymer, the process comprising polymerizing ethylene and 1-butene with a single site catalyst system in a gas phase polymerization reactor, wherein the ethylene/1-butene copolymer has density of from 0.912 to 0.94 g/cm$^3$, a melt index ($I_2$) of from 0.5 to 10 g/10 min, a melt flow ratio ($I_{21}/I_2$) of from 20 to 35, a molecular weight distribution ($M_w/M_n$) of from 2.0 to 4.5, and which satisfies the following relationship:

$$(CDBI_{50}/\delta_{XO})^{3.0} \leq 6.5 - 5.7 \log [a(1.5(I_{21}/I_2)+(M_w/M_n))];$$

where $CDBI_{50}$ is the composition distribution breadth index, $\delta_{XO}$ is the crossover phase angle at a frequency of 1.0 rad/s and a is the CY a parameter.

4. The process of claim 3 wherein the ethylene/1-butene copolymer further satisfies the relationship:

$$\sigma^{MS} \geq 5.0 \times 10^{-4} \times G^*_{XO};$$

where $\sigma^{MS}$ is the accelerated haul-off melt strength determined at 190° C.; and $G^*_{XO}$ is the crossover complex modulus at a frequency of 1.0 rad/s.

5. The process of claim 3, wherein the ethylene/1-butene copolymer has an accelerated haul-off melt strength ($\sigma^{MS}$) as determined by Rosand capillary rheometry at 190° C., of at least 3.0 cN.

6. The process of claim 4, wherein the ethylene/1-butene copolymer has an accelerated haul-off melt strength ($\sigma^{MS}$) as determined by Rosand capillary rheometry at 190° C., of at least 3.0 cN.

7. The process of claim 3 wherein the single site catalyst system comprises a phosphinimine catalyst, a cocatalyst and an inert support.

8. The process of claim 7 wherein the phosphinimine catalyst has the formula:

$$(1\text{-}R^¥\text{-Indenyl})Ti(N=P(t\text{-}Bu)_3)X_2;$$

wherein $R^¥$ is a substituted or unsubstituted alkyl group, a substituted or an unsubstituted aryl group, or a substituted or unsubstituted benzyl group, wherein substituents for the alkyl, aryl or benzyl group are selected from alkyl, aryl, alkoxy, aryloxy, alkylaryl, arylalkyl and halide substituents; and wherein X is an activatable ligand.

* * * * *